(12) United States Patent
    Natori et al.

(10) Patent No.: US 9,970,745 B2
(45) Date of Patent: May 15, 2018

(54) MEASUREMENT TARGET MEASURING PROGRAM, MEASUREMENT TARGET MEASURING METHOD, AND MAGNIFYING OBSERVATION DEVICE

(71) Applicant: Keyence Corporation, Osaka (JP)

(72) Inventors: Kazuki Natori, Osaka (JP); Shinya Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 148 days.

(21) Appl. No.: 15/208,630

(22) Filed: Jul. 13, 2016

(65) Prior Publication Data

US 2017/0030706 A1 Feb. 2, 2017

(30) Foreign Application Priority Data

Jul. 30, 2015 (JP) ................................. 2015-151261

(51) Int. Cl.
    *H04N 7/18* (2006.01)
    *H04N 13/02* (2006.01)
    (Continued)

(52) U.S. Cl.
    CPC .......... *G01B 11/0608* (2013.01); *G06T 7/001* (2013.01); *G06T 7/337* (2017.01); *G06T 7/521* (2017.01); *G06T 7/60* (2013.01); *G06T 2200/04* (2013.01); *G06T 2207/10056* (2013.01); *G06T 2207/20101* (2013.01); *G06T 2207/30164* (2013.01)

(58) Field of Classification Search
    CPC .............. G01B 11/0608; G01B 11/022; G06T 2200/04; G06T 2207/10056; G06T 2207/20101; G06T 2207/30164; G06T 7/001; G06T 7/337; G06T 7/521; G06T 7/60; H04N 13/0246; H04N 7/18; H04N 13/02

USPC ............................. 348/46, 79, 135; 382/286
    See application file for complete search history.

(56) References Cited

U.S. PATENT DOCUMENTS 8,743,374 B2  6/2014  Nakatsukasa
8,885,176 B2  11/2014  Tabuchi
(Continued)

FOREIGN PATENT DOCUMENTS

JP    2002-046087    2/2002
JP    2012-026895    2/2012

*Primary Examiner* — Sherrie Hsia
(74) *Attorney, Agent, or Firm* — Kilyk & Bowersox, P.L.L.C.

(57) ABSTRACT

Provided are a measurement target measuring method, and a magnifying observation device which make it possible to readily and intuitively recognize a deviation between actual height image data and CAD data concerning a specific portion of a measurement target. A CAD height data generation unit generates a plurality of pieces of CAD height data based on basic CAD data. A reference height data selection unit selects reference height data from the plurality of pieces of CAD height data. A reference appearance image data acquisition unit acquires a reference appearance image corresponding to the reference height data. A target image display unit displays a target image based on texture image data or actual height image data, and a reference image display unit displays a reference image based on the reference appearance image data or the reference height data.

20 Claims, 21 Drawing Sheets

(51) Int. Cl.
*G01B 11/06* (2006.01)
*G06T 7/60* (2017.01)
*G06T 7/00* (2017.01)
*G06T 7/33* (2017.01)
*G06T 7/521* (2017.01)

(56) References Cited

U.S. PATENT DOCUMENTS

| | | |
|---|---|---|
| 9,151,600 B2 | 10/2015 | Nakatsukasa |
| 9,291,450 B2 | 3/2016 | Takahashi |
| 2006/0056732 A1* | 3/2006 | Holmes ............... G06T 7/33 |
| | | 382/286 |
| 2014/0071243 A1 | 3/2014 | Nakatsukasa |
| 2017/0032177 A1 | 2/2017 | Suenaga et al. |

* cited by examiner

TEXTURE IMAGE

ACTUAL HEIGHT IMAGE

MEASUREMENT TARGET MEASURING PROGRAM, MEASUREMENT TARGET MEASURING METHOD, AND MAGNIFYING OBSERVATION DEVICE

CROSS-REFERENCE TO RELATED APPLICATIONS

The present application claims foreign priority based on Japanese Patent Application No. 2015-151261, filed Jul. 30, 2015, the contents of which is incorporated herein by reference.

BACKGROUND OF THE INVENTION

1. Field of the Invention

The present invention relates to a measurement target measuring program, a measurement target measuring method, and a magnifying observation device which enable comparison between CAD data and other image data.

2. Description of Related Art

Using a triangular ranging system or the like, it is possible to acquire image data which includes distance information (e.g., a height or a depth) from a reference position of a target in one direction (hereinafter the image data is referred to as distance image data). Japanese Unexamined Patent Publication Nos. 2002-46087 and 2012-26895 each describe a technique of comparing such distance image data with previously generated CAD data.

In a measurement device of Japanese Unexamined Patent Publication No. 2002-46087, three-dimensional coordinate values of a target are acquired by a distance image sensor. The three-dimensional coordinate values are converted according to a CAD model coordinate system to form a target model, and a simulated image is generated from the target model. Meanwhile, a CAD model is formed from CAD data of the target which is stored in a memory, and a CAD model simulated image is generated from the CAD model. Depth information of the target model simulated image is compared with depth information of the CAD model simulated image, to measure an amount of positional deviation between the CAD model and the target model.

In a position posture measuring device of Japanese Unexamined Patent Publication No. 2012-26895, a distance image of a target object is measured by a distance sensor as three-dimensional information. A depth value included in the distance image is converted to three-dimensional coordinates in a reference coordinate system, and required measurement data is sampled from the converted three-dimensional point group. A saved three-dimensional model of the target object is associated with the selected measurement data, to measure a position and a posture of the target object.

The techniques described in Japanese Unexamined Patent Publication Nos. 2002-46087 and 2012-26895 above are applicable to position measurement for a target, and the like.

However, a dimensional error and the like of a specific portion of the target cannot be examined by those techniques. Further, it is required that the distance image data and the CAD data can be readily and intuitively compared without the need for the user to perform complex operation or the like.

SUMMARY OF THE INVENTION

It is an object of the present invention to provide a measurement target measuring program, a measurement target measuring method, and a magnifying observation device which make it possible to readily and intuitively recognize a deviation between actual height image data and CAD data concerning a specific portion of a measurement target.

(1) According to one embodiment of the invention, a measurement target measuring program causes a computer to execute the steps of: acquiring three-dimensional basic CAD data that represents a measurement target; acquiring actual height image data that includes as height information a distance from a reference position to each part on the surface of the measurement target in one direction; generating a plurality of pieces of CAD height image data that each include as height information distances from a reference position to respective parts on the surface of the measurement target in a plurality of directions on the basis of the basic CAD data; selecting, from the plurality of pieces of CAD height image data, CAD height image data with the highest matching degree with respect to the actual height image data, as reference height image data; displaying as a target image a first image based on the actual height image data or a second image corresponding to the first image, and displaying as a reference image a third image based on the reference height image data or a fourth image corresponding to the third image; performing alignment of the target image and the reference image as first alignment by pattern matching; specifying a measurement place for the measurement target; and displaying information that shows a deviation between the measurement place represented by the actual height image data and the measurement place represented by the reference height image data.

According to this measurement target measuring program, from a plurality of pieces of CAD height image data generated based on basic CAD data, CAD height image data with the highest matching degree with respect to actual height image data is selected as reference height image data. A reference image based on or corresponding to this reference height image data is displayed along with a target image based on or corresponding to the actual height image data, and the target image and the reference image are aligned by pattern matching. This facilitates the user to make a comparison between the target image and the reference image without performing complex operation.

Further, when a measurement place for the measurement target is specified, there is displayed information showing a deviation between the measurement place represented by the actual height image data and the measurement place represented by the reference height image data. In this case, the user can readily and accurately specify the measurement place based on the mutually aligned target image and reference image. Further, the user can readily and intuitively recognize the deviation between the actual height image data and the CAD data concerning a specific portion of the measurement target.

(2) The plurality of directions may include first, second, third, fourth, fifth and sixth directions. The first and second directions may be parallel and reversed to each other. The second and third directions may be parallel and reversed to each other. The fifth and sixth directions may be parallel and reversed to each other. The third and fourth directions may be respectively orthogonal to the first and second directions. The fifth and sixth directions may be respectively orthogonal to the first and second directions and respectively orthogonal to the third and fourth directions. In this case, the reference height image data can be appropriately selected based on six pieces of CAD height image data corresponding to the first to sixth directions.

(3) In a three-dimensional coordinate system corresponding to the basic CAD data, first, second and third axes may be set. The first and second directions may be parallel to the first axis, the third and fourth directions may be parallel to the second axis, and the fifth and sixth directions may be parallel to the third axis. In this case, the first to sixth directions correspond to the first to third respective axes of the basic CAD data, to thereby facilitate generation of six pieces of CAD height image data.

(4) In the measurement target measuring program, the computer may be caused to execute the step of displaying the reference image before the step of performing the first alignment. In this case, the user can check the reference image before the first alignment.

(5) In the measurement target measuring program, the reference image may be moved with respect to the target image before the step of performing the first alignment, and the target image may be moved with respect to the reference image in the step of performing the first alignment. In this case, the alignment can be performed without giving the user a feeling of strangeness.

(6) In the measurement target measuring program, the computer may be caused to further execute a step of changing an orientation of the target image. In this case, the user can appropriately change the orientation of the target image.

(7) In a three-dimensional coordinate system corresponding to the actual height image data and the reference height image data, a fourth axis parallel to the one direction or a direction corresponding to the reference height image data, and fifth and sixth axes orthogonal to each other on a plane vertical to the fourth axis may be separately defined. The step of performing the first alignment may include a parallel position adjustment step of performing alignment in a direction parallel to the fifth and six axes, and alignment in a rotating direction around an axis parallel to the fourth axis, and a height adjustment step of performing alignment in a direction parallel to the fourth axis after the parallel position adjustment step. In this case, after the alignment on the plane vertical to the fourth axis is performed, the alignment in the direction parallel to the fourth axis is performed. This enables efficient alignment of the target image and the reference image.

(8) In the measurement target measuring program, the computer may be caused to further execute a step of displaying a CAD image based on the basic CAD data before the step of selecting the reference height image data. In this case, while seeing the CAD image, the user can perform checking on the correctness/incorrectness of the basic CAD data, checking on the correctness/incorrectness of the reference height image data, and the like.

(9) In the measurement target measuring program, the computer may be caused to further execute a step of specifying a reference position of the measurement target after the step of performing the first alignment, and performing alignment of the target image and the reference image as second alignment with the reference position taken as a reference. In this case, concerning a specific portion of the measurement target, the alignment can be more accurately performed.

(10) In a three-dimensional coordinate system corresponding to the actual height image data and the reference height image data, a fourth axis parallel to the one direction or a direction corresponding to the reference height image data, and fifth and sixth axes orthogonal to each other on a plane vertical to the fourth axis may be separately defined. In the step of performing the second alignment, at least one of alignment in a rotating direction around an axis parallel to the fourth axis, alignment in a direction parallel to the fifth and six axes, and alignment in a direction parallel to the fourth axis may be performed. In this case, concerning a specific portion of the measurement target, alignment in accordance with a purpose can be performed with high accuracy.

(11) In the measurement target measuring program, in the step of displaying the reference image, the reference image with an orientation adjusted with respect to the target image may be first displayed. In this case, the user does not see an unnecessary image, thus leading to a reduced load of the user and lowered consumption of the unnecessary time.

(12) In the measurement target measuring program, the computer may be caused to further execute a step of acquiring actual appearance image data representing an appearance of the measurement target which is obtained by imaging in the one direction. The second image may be an image based on the actual appearance image data. In this case, displaying the second image as the target image can facilitate the user to view the appearance of the measurement target.

(13) According to another embodiment of the invention, a measurement target measuring method includes the steps of acquiring three-dimensional basic CAD data representing a measurement target; acquiring actual height image data that includes as height information a distance from a reference position to each part on the surface of the measurement target in one direction; generating a plurality of pieces of CAD height image data that each include as height information distances from a reference position to respective parts on the surface of the measurement target in a plurality of directions on the basis of the basic CAD data; selecting, from the plurality of pieces of CAD height image data, CAD height image data with the highest matching degree with respect to the actual height image data, as reference height image data; displaying as a target image a first image based on the actual height image data or a second image corresponding to the first image, and displaying as a reference image a third image based on the reference height image data or a fourth image corresponding to the third image; performing alignment of the target image and the reference image as first alignment by pattern matching; specifying a measurement place for the measurement target; and displaying information that shows a deviation between the measurement place represented by the actual height image data and the measurement place represented by the reference height image data.

According to this measurement target measuring method, the user can readily and intuitively recognize the deviation between the actual height image data and the CAD data concerning a specific portion of the measurement target.

(14) According to still another embodiment of the invention, a magnifying observation device includes: a stage on which a measurement target is to be placed; a height image data acquisition unit for acquiring actual height image data that includes as height information a distance from a reference position to each part on the surface of the measurement target placed on the stage in one direction; a storage part for storing three-dimensional basic CAD data representing the measurement target; a display part; an operation part operated by a user; and an information processing part. The information processing part includes a basic CAD data acquisition unit for acquiring the basic CAD data to be stored into the storage unit, an acquisition command unit for giving a command to the height image data acquisition unit to acquire the actual height image data, a CAD height image data generation unit for generating a plurality of pieces of CAD height image data that each include as height information distances from a reference position to respective parts on the surface of the measurement target in a plurality of directions on the basis of the basic CAD data, a reference height image data selection unit for selecting, from the plurality of pieces of CAD height image data, CAD height image data with the highest matching degree with respect to the actual height image data, as reference height image data, an image display unit for making the display part display as a target image a first image based on the actual height image data or a second image corresponding to the first image, and making the display part display as a reference image a third image based on the reference height image data or a fourth image corresponding to the third image, an alignment performing unit for performing alignment of the target image and the reference image by pattern matching, a measurement place specifying unit for specifying a measurement place for the measurement target on the basis of operation of the operation part, and a deviation information display unit for making the display part display information that shows a deviation between the measurement place represented by the actual height image data and the measurement place represented by the reference height image data.

In this magnifying observation measuring device, from a plurality of pieces of CAD height image data generated based on basic CAD data, CAD height image data with the highest matching degree with respect to actual height image data is selected as reference height image data. A reference image based on or corresponding to this reference height image data is displayed along with a target image based on or corresponding to the actual height image data, and the target image and the reference image are aligned by pattern matching. This facilitates the user to make a comparison between the target image and the reference image without performing complex operation.

Further, when a measurement place for the measurement target is specified, there is displayed information showing a deviation between the measurement place represented by the actual height image data and the measurement place represented by the reference height image data. In this case, the user can readily and accurately specify the measurement place based on the mutually aligned target image and reference image. Further, the user can readily and intuitively recognize the deviation between the actual height image data and the CAD data concerning a specific portion of the measurement target.

According to the present invention, the user can readily and intuitively recognize a deviation between actual height image data and CAD data concerning a specific portion of a measurement target.

BRIEF DESCRIPTION OF THE DRAWINGS

DETAILED DESCRIPTION OF PREFERRED EMBODIMENT (1) Configuration of Magnifying Observation Device FIG. 2 is a schematic view showing a configuration of a measuring part of a magnifying observation device 500 of FIG. 1. Hereinafter, the magnifying observation device 500 according to the present embodiment will be described with reference to FIGS. 1 and 2. As illustrated in FIG. 1, the magnifying observation device 500 is provided with a measuring part 100, a PC (personal computer) 200, a control part 300, and a display part 400.

As shown in FIG. 1, the measuring part 100 is a microscope, for example, and includes a light projection part 110, a light reception part 120, an illumination light output part 130, a stage device 140, and a control board 150. The light projection part 110, the light reception part 120, and the illumination light output part 130 constitute a measurement head 100H. As shown in FIG. 2, the light projection part 110 includes a measurement light source 111, a pattern generation part 112, and a plurality of lenses 113, 114, 115. The light reception part 120 includes a camera 121 and a plurality of lenses 122, 123.

As shown in FIG. 1, the stage device 140 includes a stage 141, a stage operation part 142, and a stage drive part 143. A measurement target S is placed on the stage 141. As shown in FIG. 2, the stage 141 is made up of an X-Y stage 10, a Z stage 20, and a θ stage 30. The stage 141 may further include a fixation member (clamp), not shown, for fixing the measurement target S to the surface where the measurement target S is placed (hereinafter referred to as placement surface).

As shown in FIG. 2, the light projection part 110 is disposed obliquely above the stage 141. The measuring part 100 may include a plurality of light projection parts 110. In the example of FIG. 2, the measuring part 100 includes two light projection parts 110. Hereinafter, when the two light projection parts 110 are to be distinguished, one light projection part 110 is referred to as a light projection part 110A, and the other light projection part 110 is referred to as a light projection part 110B. The light projection parts 110A, 110B are symmetrically disposed with a light axis of the light reception part 120 located therebetween.

Figure 1:
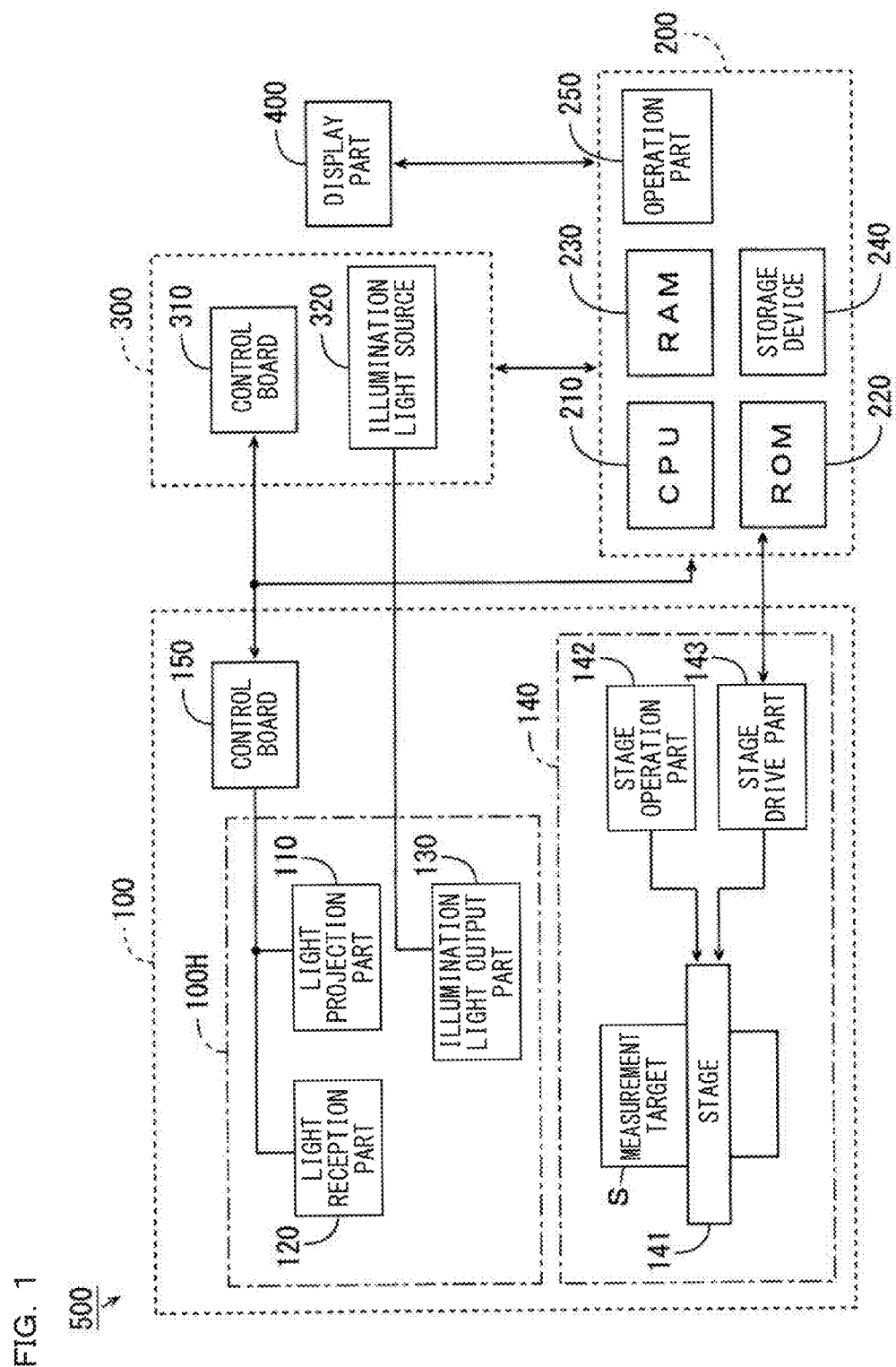
FIG. 1 is a block diagram showing a configuration of a magnifying observation device according to one embodiment of the present invention.

The measurement light source 111 of each of the light projection parts 110A, 110B is, for example, a halogen lamp that emits white light. The measurement light source 111 may be another light source such as a white LED (light emitting diode) that emits white light. Light emitted from the measurement light source 111 (hereinafter referred to as measurement light) is appropriately collected by the lens 113, and thereafter incident on the pattern generation part 112.

The pattern generation part 112 is a DMD (digital micromirror device), for example. The pattern generation part 112 may be an LCD (liquid crystal display), an LCOS (liquid crystal on silicon), or a mask. The measurement light incident on the pattern generation part 112 is converted to have a previously set pattern and a previously set intensity (brightness), and then emitted. Hereinafter, a portion of the measurement light with an intensity not smaller than a prescribed value is referred to as a bright portion, and a portion of the measurement light with an intensity smaller than the prescribed value is referred to as a dark portion.

The measurement light emitted from the pattern generation part 112 is converted to light having a relatively large diameter by a plurality of lenses 114, 115. Thereafter, the measurement target S on the stage 141 is irradiated with the converted light. The light reception part 120 is disposed above the stage 141. The measurement light reflected upward from the stage 141 by the measurement target S is collected to form an image by a plurality of lenses 122, 123 of the light reception part 120, which is then received by a camera 121.

The camera 121 is, for example, a CCD (charge coupled device) camera including an imaging element 121a and a lens. The imaging element 121a is a monochrome CCD (charge coupled device), for example. The imaging element 121a may be a color CCD, or another imaging element such as a CMOS (complementary metal-oxide semiconductor) image sensor. From each pixel of the imaging element 121a, an analog electric signal corresponding to a light reception amount (hereinafter referred to as light reception signal) is outputted to the control board 150.

The control board 150 is mounted with an A/D converter (analog/digital converter) and a FIFO (first in first out) memory, not shown. The light reception signal outputted from the camera 121 is sampled in a constant sampling cycle and converted to a digital signal by the A/D converter of the control board 150 based on control by the control part 300. The digital signals outputted from the A/D converter are sequentially stored into the FIFO memory. The digital signals stored into the FIFO memory are sequentially transmitted as pixel data to the PC 200.

As shown in FIG. 1, the PC 200 includes a CPU (central processing unit) 210, a ROM (read only memory) 220, a RAM (random access memory) 230, a storage device 240, and an operation part 250. Further, the operation part 250 includes a key board and a pointing device. As the pointing device, a mouse, a joystick, or the like is used.

Computer programs such as a system program and a measurement target measuring program are stored into the ROM 220. The RAM 230 is to be used for processing a variety of data. The storage device 240 is made up of a hard disk and the like. The storage device 240 is used for saving a variety of data, such as pixel data, given from the control board 150. Further, one or more pieces of three-dimensional CAD data of the measurement target S are stored into the storage device 240. Moreover, the measurement target measuring program may be stored into the storage device 240.

The CPU 210 generates image data based on the pixel data given from the control board 150. Further, the CPU 210 performs a variety of processing on the generated image data by use of the RAM 230, and displays on the display part 400 an image based on the image data. Further, the CPU 210 applies a drive pulse to the stage drive part 143. The display part 400 is formed of an LCD panel or an organic EL (electroluminescence) panel, for example.

The control part 300 includes a control board 310 and an illumination light source 320. The control board 310 is mounted with a CPU, not shown. The CPU of the control board 310 controls the light projection part 110, the light reception part 120, and the control board 150 based on a command from the CPU 210 of the PC 200.

The illumination light source 320 includes three LEDs respectively emitting red light, green light, and blue light, for example. Controlling the luminance of the light emitted from each LED enables generation of light with any color from the illumination light source 320. The light generated from the illumination light source 320 (hereinafter referred to as illumination light) is outputted from the illumination light output part 130 of the measuring part 100 through a light guiding member (light guide). Note that the illumination light source 320 may not be provided in the control part 300 but be provided in the measuring part 100. In this case, the illumination light output part 130 is not provided in the measuring part 100.

Figure 2:
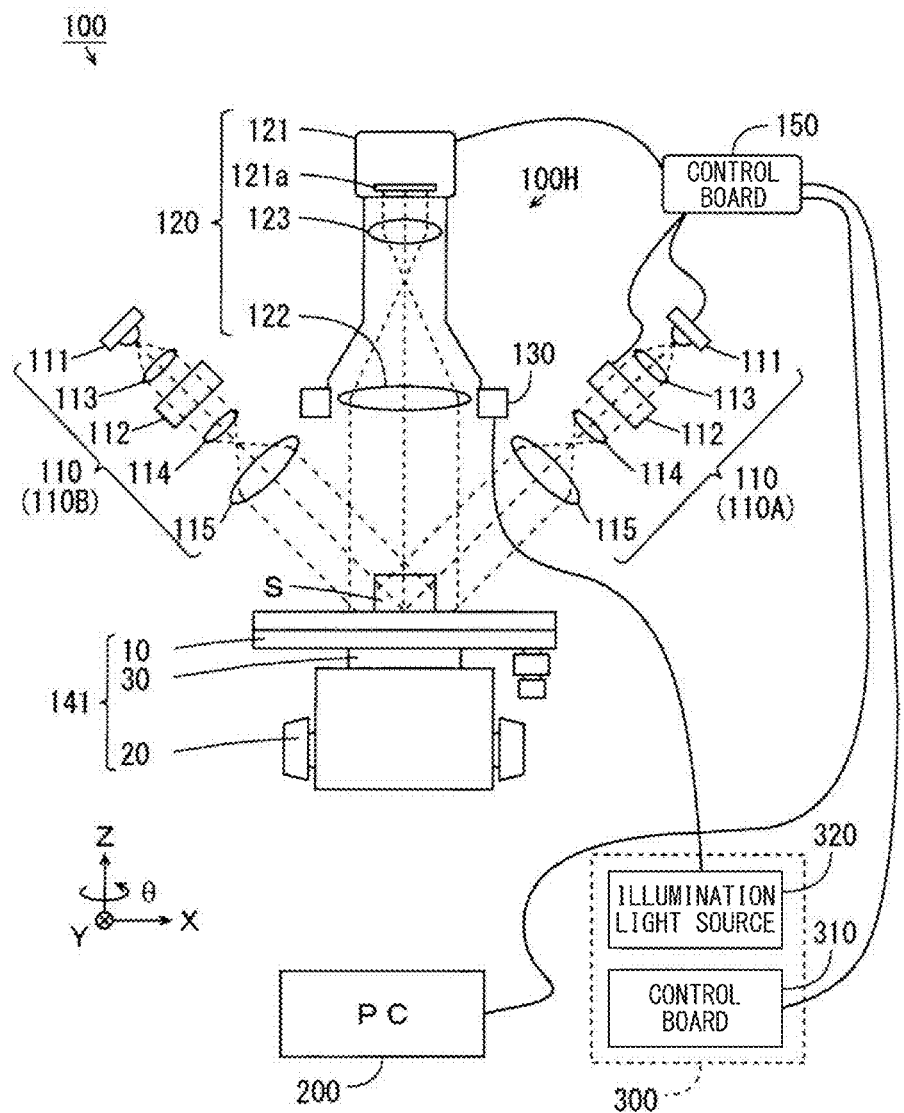
FIG. 2 is a schematic view showing a configuration of a measuring part of the magnifying observation device of FIG. 1.

The illumination light output part 130 of FIG. 2 has a ring shape, and is disposed above the stage 141 so as to surround the lens 122 of the light reception part 120. Thereby, the measurement target S is irradiated with the illumination light from the illumination light output part 130 such that a shade is not generated. Since the irradiation with the illumination light is performed from substantially straight above the measurement target 5, even when the measurement target S has a hole, the illumination light reaches the bottom of the hole. It is thus possible to observe the bottom of the hole as well as the surface of the measurement target S by the illumination light.

In the measuring part 100, in a state where the measurement target is irradiated with the illumination light from the illumination light output part 130, texture image data representing the appearance of the measurement target S seen in one direction is generated. The texture image data is an example of the actual appearance image data. Further, in the measuring part 100, actual height image data including height information of the measurement target S is generated. A detail of the actual height image data will be described later. On the display part 400, a texture image based on the texture image data and an actual height image based on the actual height image data are displayed. Further, synthesized image data showing a synthesized image of the texture image data and the actual height image data may be generated, and a synthesized image based on the synthesized image data may be displayed. Note that the height image (the actual height image and a CAD height image described later) is also referred to as a distance image.

(2) Configuration of Stage

In the measuring part 100, a three-dimensional coordinate system peculiar to the device (hereinafter referred to as an actual coordinate system) and a position of the origin are defined. The actual coordinate system of the present example has an X-axis, a Y-axis and a Z-axis that are orthogonal to each other. In FIG. 2, a direction parallel to the X-axis is taken as an X-direction and indicated by an arrow X, a direction parallel to the Y-axis is taken as a Y-direction and indicated by an arrow Y, and a direction parallel to the Z-axis is taken as a Z-direction and indicated by an arrow Z. Further, a direction of rotation around an axis parallel to the Z-direction is defined as a θ-direction and indicated by an arrow θ.

The placement surface of the stage 141 is included in a plane parallel to the X-direction and the Y-direction. The X-Y stage 10 has an X-directional movement mechanism and a Y-directional movement mechanism. The Z stage 20 has a Z-directional movement mechanism. The θ stage 30 has a θ-directional rotation mechanism.

A plane located at a focal point of the light reception part 120 and vertical to the light axis of the light reception part 120 is referred to as a focal plane of the light reception part 120. The relative positional relation of the light projection parts 110A, 110B, the light reception part 120 and the stage 141 is set such that a light axis of the light projection part 110A, a light axis of the light projection part 110B and the light axis of the light reception part 120 intersect with each other on the focal plane of the light reception part 120.

Further, a plane located at a focal point of the light projection part 110 (a point at which an image of a pattern of the measurement light is formed) and vertical to the light axis of the light projection part 110 is referred to as a focal plane of the light projection part 110. The light projection parts 110A, 110B are configured such that the focal plane of the light projection part 110A and the focal plane of the light projection part 110B intersect at a position that includes the focal point of the light reception part 120.

The center of the θ-directional rotational axis of the θ stage 30 matches the light axis of the light reception part 120. Thus, when the θ stage 30 is rotated in the θ-direction, it can be rotated around the rotational axis within a field of vision without getting the measurement target S out of the field of vision. Further, the X-Y stage 10 and the θ stage 30 are supported by the Z stage 20.

A stepping motor is used for each of the X-directional movement mechanism, the Y-directional movement mechanism, the Z-directional movement mechanism, and the θ-directional rotation mechanism of the stage 141. The X-directional movement mechanism, the Y-directional movement mechanism, the Z-directional movement mechanism, and the θ-directional rotation mechanism of the stage 141 are driven by the stage operation part 142 or the stage drive part 143 of FIG. 1.

The user operates the stage operation part 142 of FIG. 1 by hand, and can thereby move the placement surface of the stage 141 in the X-direction, the Y-direction or the Z-direction relatively to the light reception part 120, or rotate it in the θ-direction. The stage drive part 143 supplies a current to a stepping motor of the stage 141 based on the drive pulse applied from the PC 200, and can thereby move the stage 141 in the X-direction, the Y-direction or the Z-direction relatively to the light reception part 120, or rotate it in the θ-direction.

In the present embodiment, the stage 141 is an electric stage that can be operated by hand as well as driven by the stepping motor, but this is not restrictive. The stage 141 may be an electric stage that can be driven only by the stepping motor, or may be a manual stage that can be operated only by hand. Further, the disposition of the X-Y stage 10, the Z stage 20 and the θ stage 30 is not restricted to the above example. For example, although the X-Y stage 10 is disposed on the θ stage 30 in the example of FIG. 2, this is not restrictive, and the θ stage 30 may be disposed on the X-Y stage 10.

(3) Measurement of Shape of Measurement Target

Figure 3:
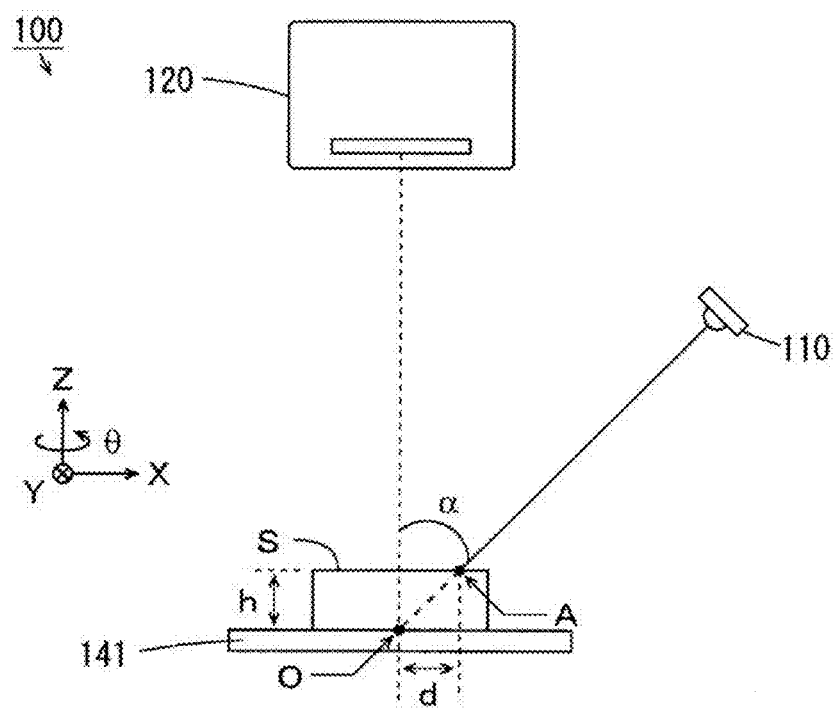
FIG. 3 is a view for explaining a principle of a triangular ranging system.

In the measuring part 100, height information of the measurement target S is acquired by the triangular ranging system. The height information represents a distance (a height) from a reference position to each part on the surface of the measurement target S in one direction (the Z-direction). The reference position is, for example, the origin of the actual coordinate system. FIG. 3 is a view for explaining a principle of the triangular ranging system. As shown in FIG. 3, an angle α between the light axis of the measurement light emitted from the light projection part 110 and the light axis of the measurement light incident on the light reception part 120 (the light axis of the light reception part 120) is previously set. The angle α is larger than 0 degrees and smaller than 90 degrees.

When the measurement target S is not placed on the stage 141, the measurement light emitted from the light projection part 110 is reflected at a point O on the placement surface of the stage 141 and incident on the light reception part 120. On the other hand, when the measurement target S is placed on the stage 141, the measurement light emitted from the light projection part 110 is reflected at a point A on the surface of the measurement target S and incident on the light reception part 120.

When a distance between the point O and the point A in the X-direction is taken as d, a height h at the point A of the measurement target S with respect to the placement surface of the stage 141 is given by: $h = d \div \tan(\alpha)$. The CPU 210 of the PC 200 of FIG. 1 measures a distance d between the point O and the point A in the X-direction based on the pixel data of the measurement target S which is given by the control board 150. Further, the CPU 210 calculates the height h of the point A on the surface of the measurement target S based on the measured distance d. The heights of all points on the surface of the measurement target S are calculated, to measure height information of the measurement target S.

In order for all the points on the surface of the measurement target S to be irradiated with measurement light, measurement light having a variety of patterns is emitted from the light projection part 110 of FIG. 1. FIGS. 4A to 4D are views showing examples of the pattern of the measurement light emitted from the light projection part 110. The pattern of the measurement light is controlled by the pattern generation part 112 of FIG. 1.

Figure 4B:
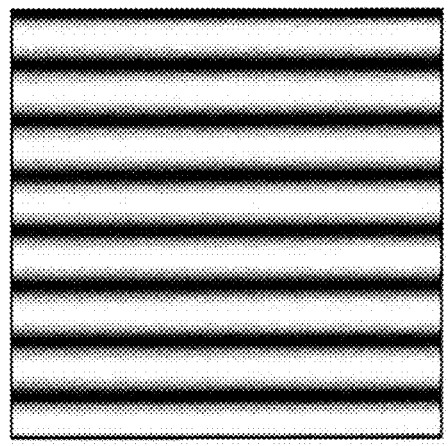
FIGS. 4A to 4D are views showing examples of a pattern of measurement light emitted from a light projection part.
Figure 4D:
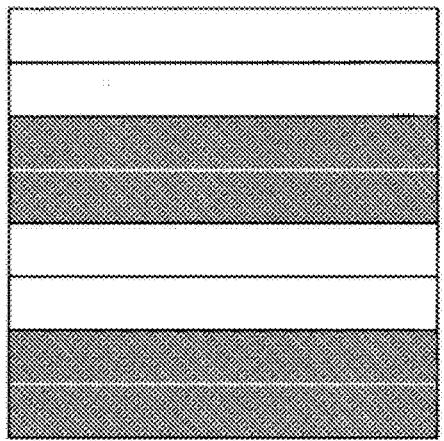
Figure 4A:
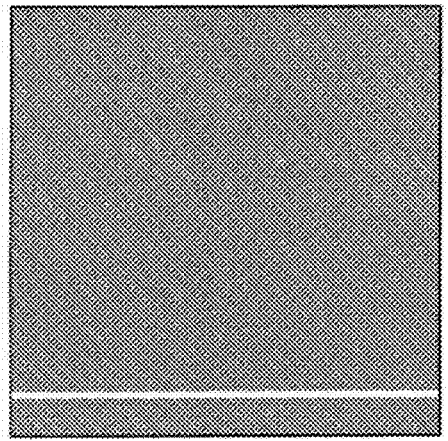

Measurement light of FIG. 4A is referred to as linear measurement light. The linear measurement light is measurement light having a linear cross section parallel to one direction. Measurement light of FIG. 4B is referred to as sinusoidal measurement light. The sinusoidal measurement light is measurement light having a linear cross section parallel to one direction and having a pattern of intensity that changes in a sinusoidal form in the other direction orthogonal to the one direction.

Figure 4C:
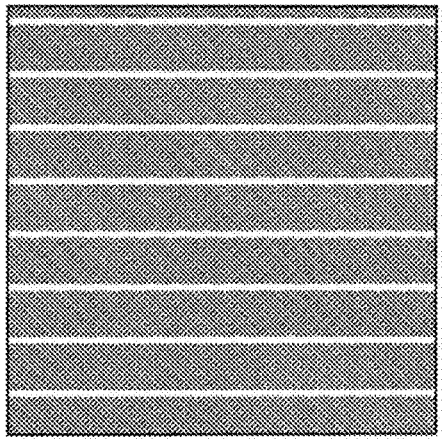

Measurement light of FIG. 4C is referred to as striped measurement light. The striped measurement light is measurement light having a linear cross section parallel to one direction and arrayed in the other direction orthogonal to the one direction. Measurement light of FIG. 4D is referred to as cord-like measurement light. The cord-like measurement light is measurement light having a linear cross section parallel to one direction and having the bright portion and the dark portion arrayed in the other direction orthogonal to the one direction.

A method for scanning the linear measurement light on the measurement target S is generally called the optical cutting method. The linear measurement light is scanned such that the entire range of irradiation with the measurement light is irradiated with the bright portion of the linear measurement light at least once in accordance with the general optical cutting method, thus generating actual height image data of the measurement target S.

Meanwhile, a method for irradiating the measurement target S with the sinusoidal measurement light, the striped measurement light or the cord-like measurement light is categorized as the pattern projection method. Among pattern projection methods, the method for irradiating the measurement target S with the sinusoidal measurement light or the striped measurement light is categorized as the phase shift method, and the method for irradiating the measurement target S with the cord-like measurement light is categorized as the spatial code method.

The sinusoidal measurement light or the striped measurement light is scanned such that the entire range of irradiation with the measurement light is irradiated with the bright portion of the sinusoidal measurement light or the striped measurement light at least once in accordance with the general phase shift method, thus generating actual height image data of the measurement target S. Further, the measurement target S is sequentially irradiated with a plurality of cord-like measurement light beams having mutually different patterns in accordance with the general spatial code method, thus generating actual height image data of the measurement target S.

(4) Texture Image and Actual Height Image

Figure 5:
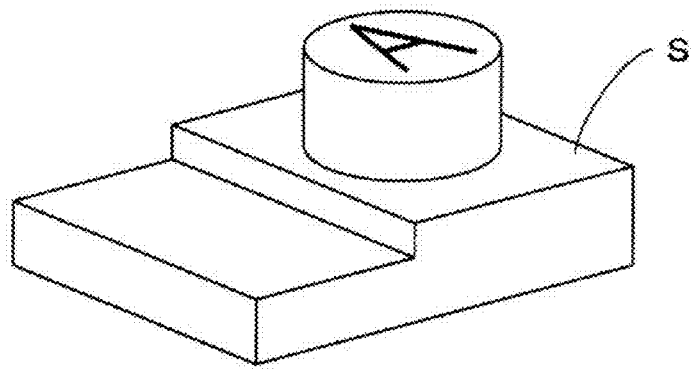
FIG. 5 is an external perspective view showing one example of a measurement target.
Figure 6:
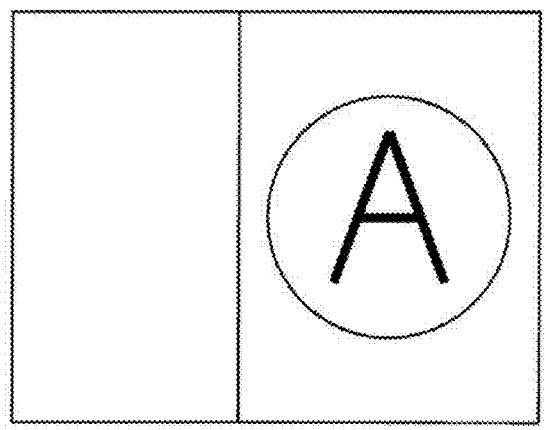
FIG. 6 is a view showing a texture image of the measurement target of FIG. 5.
Figure 7:
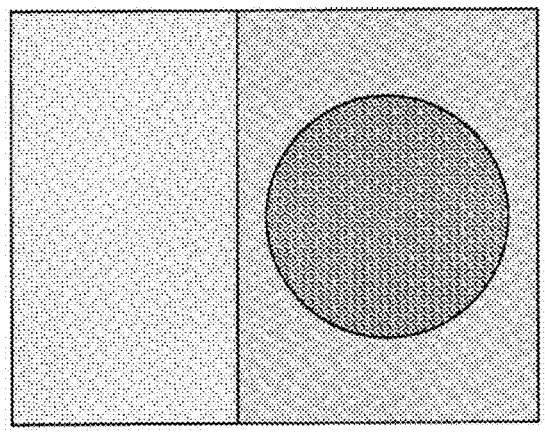
FIG. 7 is a view showing a height image of the measurement target of FIG. 5.

FIG. 5 is an external perspective view showing one example of the measurement target S. FIG. 6 shows a texture image of the measurement target S of FIG. 5, and FIG. 7 shows an actual height image of the measurement target S of FIG. 5. As described above, the texture image is displayed based on the texture image data, and the actual height image is displayed based on the actual height image data.

As shown in FIG. 6, the texture image is an image representing the appearance of the measurement target S seen in one direction (the Z-direction in the present example). As shown in FIG. 7, an actual height image represents the height of each part on the surface of the measurement target S. In FIG. 7, differences in color are represented by differences in dot pattern. For example, a portion with the smallest height is represented by blue, and a portion with the largest height is represented by red. The other portions of the measurement target S are represented by colors in accordance with the heights thereof such that the color of the portion with a larger height is closer to red and the color of the portion with a smaller height is closer to blue. In the texture image, a letter, a pattern and the like on the surface of the measurement target S are displayed in the texture image, whereas such a letter, a pattern and the like on the surface are not displayed in the actual height image.

Further, in the actual height image data, a height of a viewable portion is represented in one direction, but a height of a non-viewable portion is not represented in that direction. For example, a height of a portion of the measurement target S which is viewed only from the side is not represented in the actual height image data.

(5) CAD Data

Figure 8:
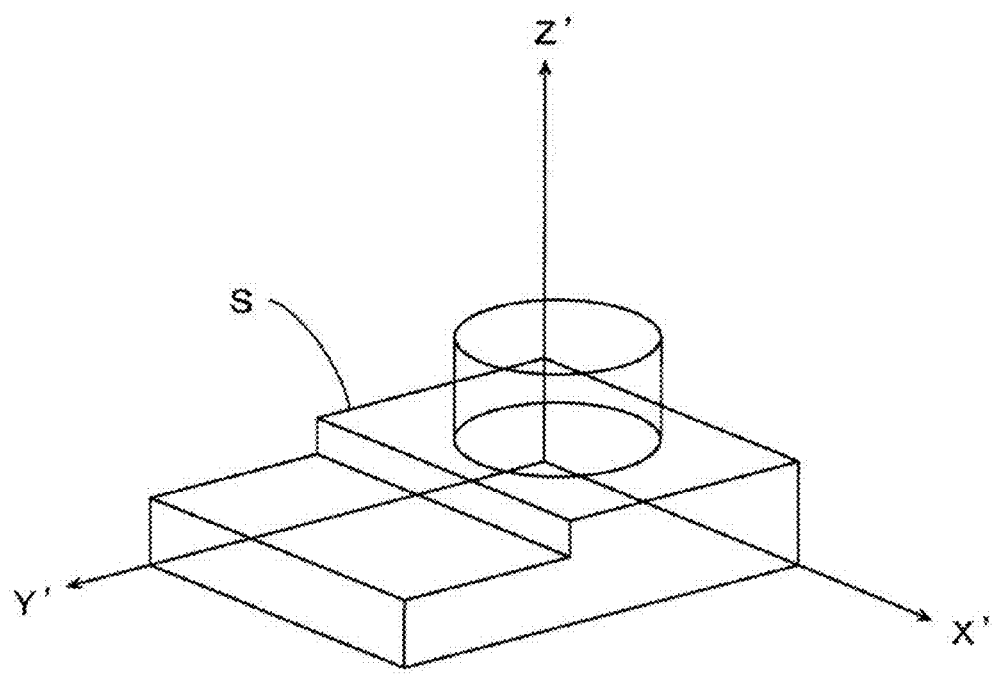
FIG. 8 is a view for explaining CAD data of the measurement target of FIG. 5.

As described above, one or more pieces of three-dimensional CAD data of the measurement target S are previously stored into the storage device 240 of FIG. 1. The CAD data represents a design size of the measurement target S. FIG. 8 is a view for explaining CAD data of the measurement target S of FIG. 5. As shown in FIG. 8, in a three-dimensional coordinate system corresponding to the CAD data (hereinafter referred to as a CAD coordinate system), an X'-axis, a Y'-axis and a Z'-axis orthogonal to each other are set. The X'-axis, the Y'-axis, and the Z'-axis are examples of the first, second and third axes. In the present example, the X'-axis, the Y'-axis, and the Z'-axis are respectively parallel to three sides of the measurement target S. The X'-axis, the Y'-axis, and the Z'-axis may be changeable as appropriate by the user's operation. Hereinafter, an image represented by the CAD data is referred to as a CAD image.

In the present embodiment, based on the CAD data, there are generated a plurality of pieces of CAD height image data (CAD height data) that each include height information representing heights from a reference position to each part on the surface of the measurement target S in a plurality of directions. In the present example, there are generated six pieces of CAD height image data respectively corresponding to a total of six directions: two directions parallel to the X'-axis and reversed to each other, two directions parallel to the Y'-axis and reversed to each other, and two directions parallel to the Z'-axis and reversed to each other. These six directions are examples of the first to sixth directions. The reference position is, for example, the origin of the CAD coordinate system.

FIGS. 9A to 9F are views for explaining a plurality of pieces of CAD height image data that are generated based on the CAD data of FIG. 8. FIGS. 9A to 9F show a plurality of CAD height images based on a plurality of pieces of CAD height image data. The CAD height images of FIGS. 9A and 9B respectively correspond to the two directions parallel to the X'-axis and reversed to each other. The CAD height images of FIGS. 9C and 9D respectively correspond to the two directions parallel to the Y'-axis and reversed to each other. The CAD height images of FIGS. 9E and 9F respectively correspond to the two directions respectively parallel to the Z'-axis and reversed to each other.

Figure 9A:
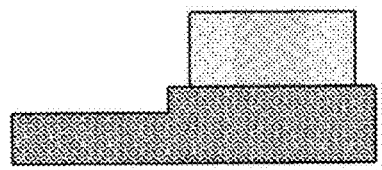
FIGS. 9A to 9F are views for explaining a plurality of pieces of CAD height image data that are generated based on the CAD data of FIG. 8.
Figure 9B:
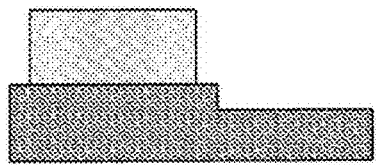
Figure 9C:
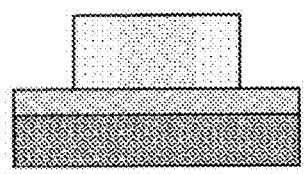
Figure 9D:
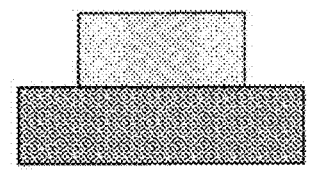
Figure 9E:
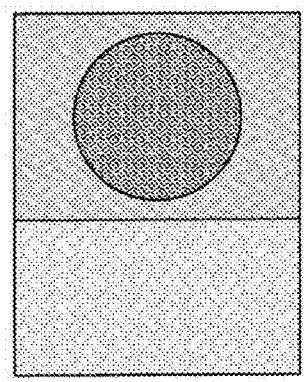
Figure 9F:
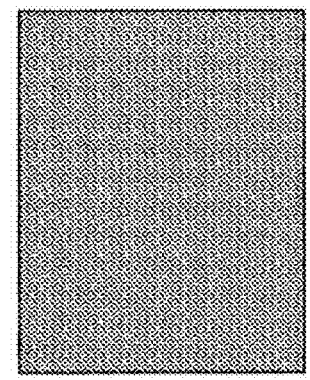

From the plurality of pieces of generated CAD height image data, CAD height image data with the highest matching degree with respect to the actual height image data is selected as reference height image data. For example, of the CAD height images of FIGS. 9A to 9F, the CAD height image of FIG. 9B has the highest matching degree with respect to the actual height image of FIG. 7. Hence the CAD height image data representing the CAD height image of FIG. 9B is selected as the reference height image data. The matching degree of each CAD height image data and the actual height image data is obtained by pattern matching, for example. Hereinafter, a CAD height image represented by the reference height image data is referred to as a reference height image.

Further, based on the CAD data, there is acquired reference appearance image data representing the appearance of the measurement target S seen in the same direction as a direction corresponding to the reference height image. Hereinafter, a CAD image represented by the reference appearance image data is referred to as a reference appearance image. The reference appearance image is an example of the fourth image. The reference appearance image data may be generated separately from the CAD data, or the CAD data may be used as the reference appearance image data.

(6) Display of Each Image

Figure 10:
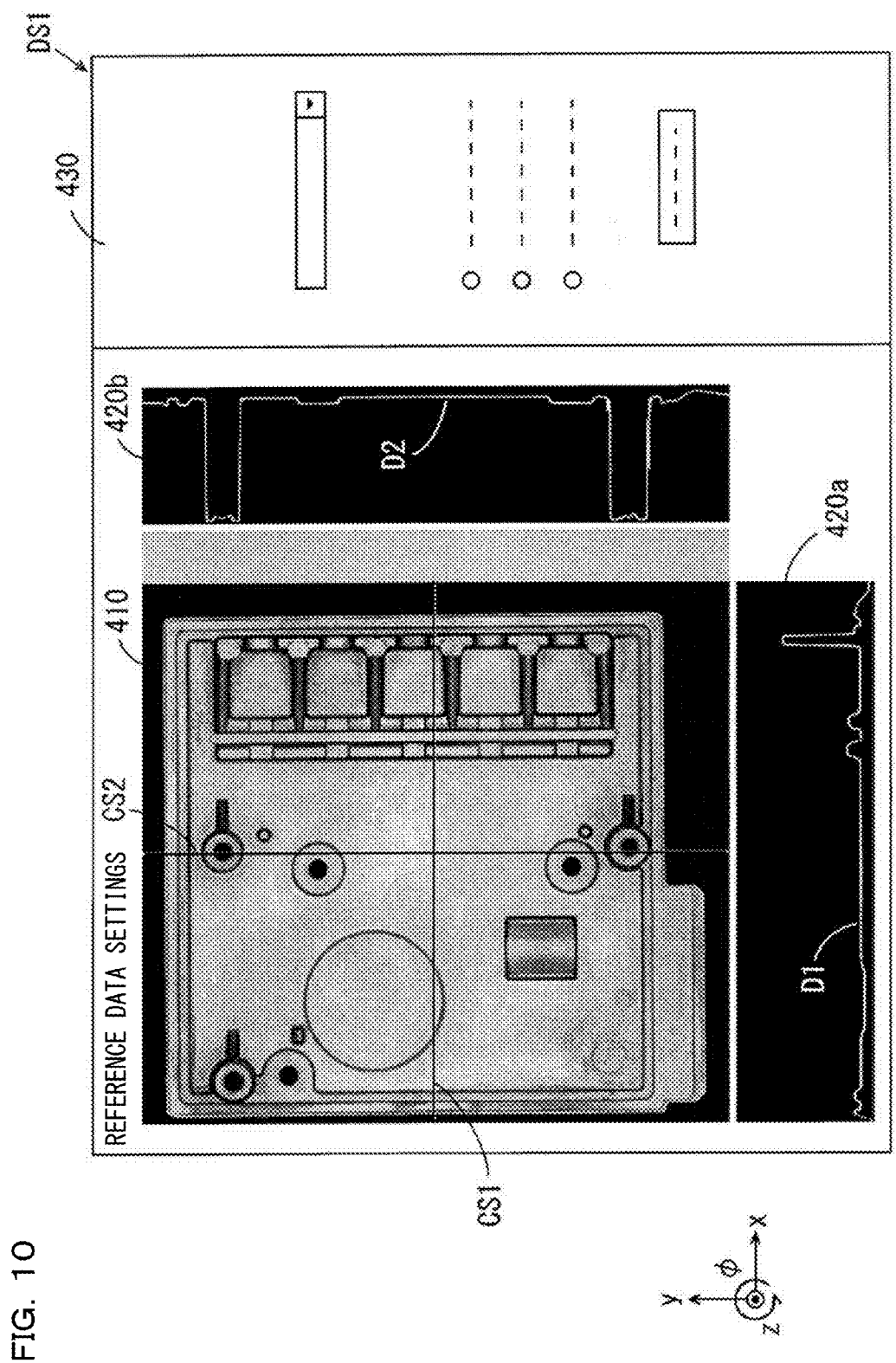
FIG. 10 is a view showing an example of an image displayed by a display part of FIG. 1.
Figure 11:
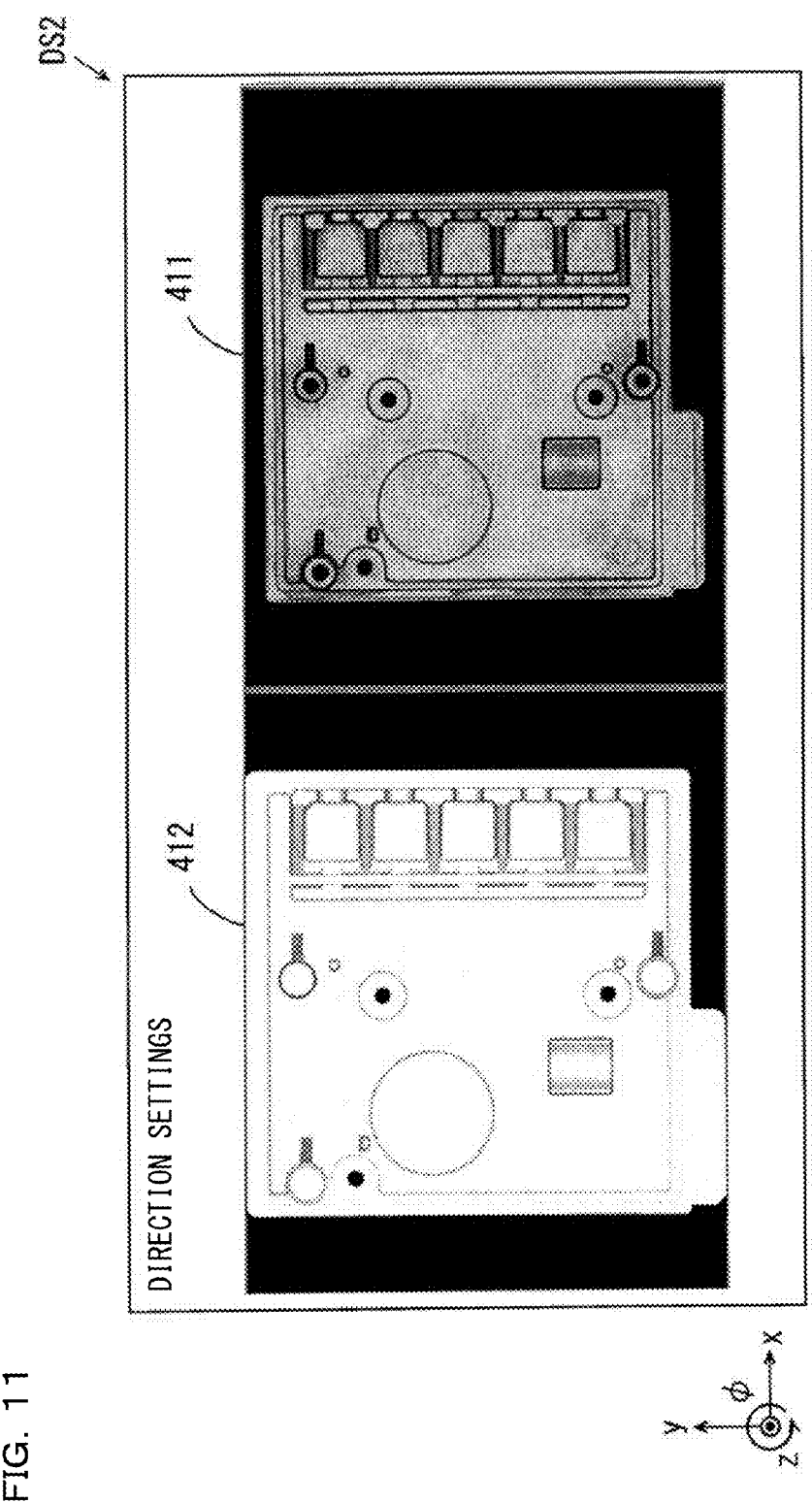
FIG. 11 is a view showing an example of images displayed by the display part of FIG. 1.

FIGS. 10 and 11 are views showing examples of images displayed by the display part 400 of FIG. 1. After generation of the texture image data and the actual height image data in the measuring part 100 of FIG. 1, a reference data setting screen DS1 of FIG. 10 is displayed. The reference data setting screen DS1 includes an image display area 410, height display areas 420a, 420b, and a setting display area 430. In the image display area 410, a texture image or an actual height image of the measurement target S is displayed based on the generated texture image data or actual height image data. The display of the texture image and the display of the actual height image may be appropriately switched based on the user's operation. Hereinafter, the texture image data and the actual height image data will be collectively referred to as actual image data, and the texture image and the actual height image will be collectively referred to as a target image.

Further, in the image display area 410, there are displayed a linear cursor CS1 extending horizontally, and a linear cursor CS2 extending vertically. In the height display area 420a, there are displayed a height display line D1 representing height information of a portion of the target image which overlaps the cursor CS1. In the height display area 420b, a height display line D2 representing height information of a portion of the target image which overlaps the cursor CS2. The height display lines D1, D2 are generated based on the actual height image data and each represent a cross sectional profile of the measurement target S. In the setting display area 430, there are displayed buttons for making a variety of settings, a check box, a pulldown menu, and the like.

In the setting display area 430, for example, the user selects appropriate CAD data from the CD data stored in the storage device 240 of FIG. 1. Based on the selected CAD data, a plurality of pieces of CAD height image data are generated as described above. From the plurality of pieces of generated CAD height image data, CAD height image data with the highest matching degree with respect to the generated actual height image data is selected as reference height image data. Further, based on the CAD data, there is acquired reference appearance image data representing the appearance of the measurement target S seen in a direction corresponding to the reference height image data.

When the reference height image data is selected, a direction setting screen DS2 of FIG. 11 is displayed, for example. The direction setting screen DS2 includes image display areas 411, 412. In the image display area 411, the target image (the texture image or the actual height image) is displayed. In the image display area 412, the reference appearance image or the reference height image is displayed based on the reference appearance image data or the reference height image data. Hereinafter, the reference appearance image data and the reference height image data will be collectively referred to as reference image data, and the reference appearance image and the reference height image will be collectively referred to as a reference image.

The display of the reference appearance image and the display of the reference height image may be appropriately switchable by the user's operation. For example, when a comparison in terms of appearance is to be made, the texture image and the reference appearance image are displayed, and when a comparison including height information is to be made, the actual height image and the reference height image are displayed.

The orientation of the reference image (the rotating position) displayed in the image display area 412 is adjusted so as to substantially match the orientation of the target image displayed in the image display area 411. For example, the orientation of the reference image is adjusted by the pattern matching. The orientation of the reference image may be adjusted as appropriate based on the user's operation. Moreover, when wrong CAD height image data is selected as the reference height image data, or when the selection of the reference height image data fails, the user may be able to specify appropriate reference height image data as appropriate from the plurality of pieces of CAD height image data.

A reference image that is first displayed after the selection of the appropriate CAD data is preferably a reference image with its orientation adjusted. Here, the meaning of being "first displayed" excludes being instantaneously displayed during internal processing, but being "first displayed" means being first displayed in a still state after completion of the above series of processing. Normally, when the CAD data is used for comparison with the target image, there is no need for an image of the measurement target S seen in a direction different from the direction of the target image. Further, when the orientation of the reference image differs from the orientation of the target image, these are difficult to compare. Thus, the reference image with its orientation adjusted is first displayed while other images are not displayed, thereby allowing the subsequent processing to be smoothly proceeded. This reduces a load of the user and enhances the processing efficiency. Note that it may be possible to display as appropriate a CAD image representing a stereoscopic shape of the measurement target S based on the user's operation.

(7) Alignment

Next, the alignment of the target image displayed in the image display area 410 will be described. In the present embodiment, simplified alignment and advanced alignment can be performed as the alignment. In a three-dimensional coordinate system corresponding to the actual height image data and the reference height image data (hereinafter referred to as a height image coordinate system), an x-axis, a y-axis and a z-axis orthogonal to each other are defined. The z-axis is an example of the fourth axis, and the x-axis and y-axis are examples of the fifth and six axes. In the following description, directions parallel to the x-axis, the y-axis, and the z-axis are respectively referred to as an x-direction, a y-direction, and a z-direction. Further, a rotational direction around an axis in the z-direction is defined as a φ-direction. The x-direction, the y-direction, the z-direction, and the φ-direction respectively correspond to the X-direction, the Y-direction, the Z-direction, and the φ-direction described above. On the screen, the x-direction corresponds to the horizontal direction, the y-direction corresponds to the vertical direction, and the z-direction corresponds to the depth direction. In the drawings, the x-direction, the y-direction, the z-direction, and the φ-direction are indicated by arrows x, y, z, φ.

(7-1) Simplified Alignment

Figure 12:
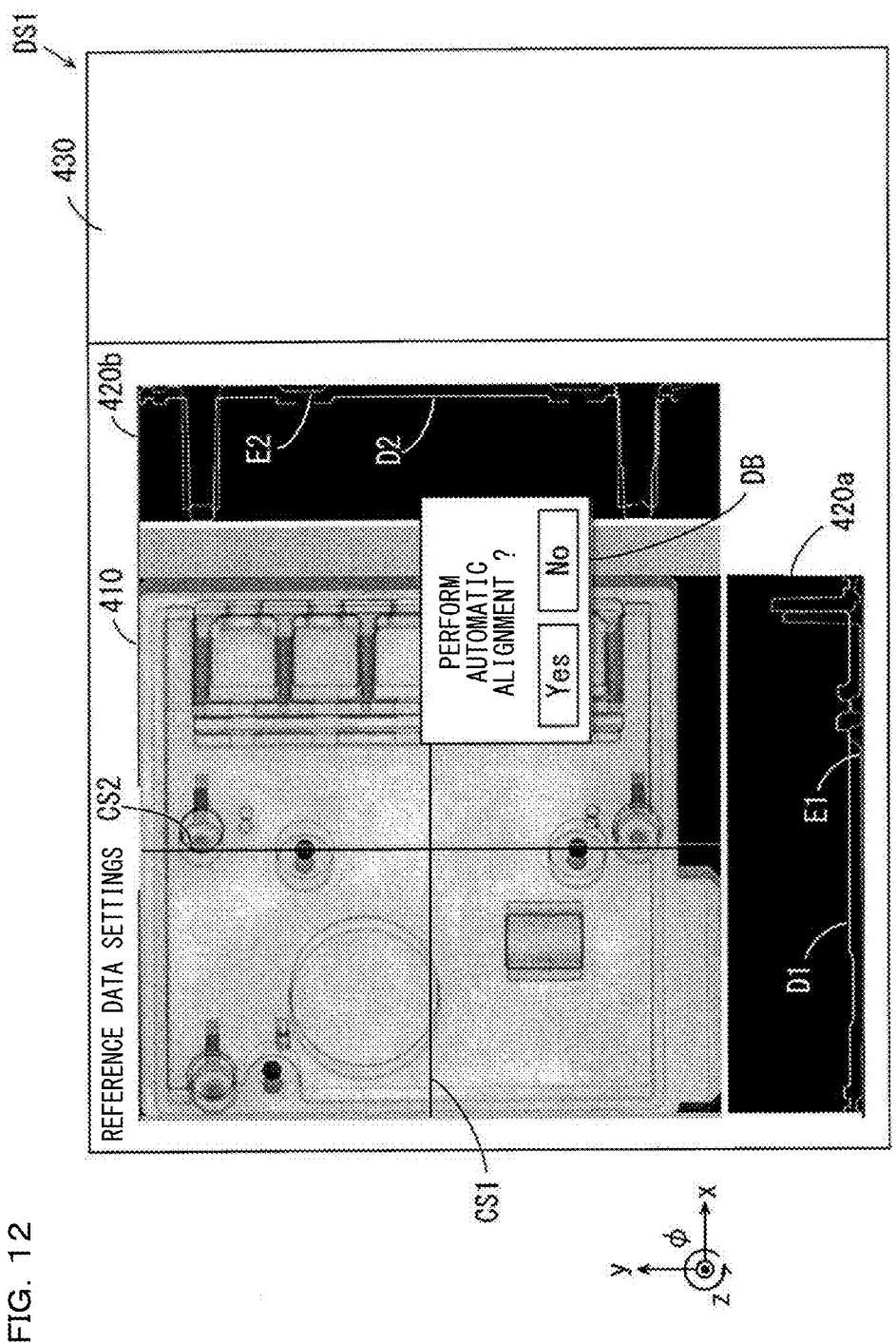
FIG. 12 is a view for explaining simplified alignment.
Figure 13:
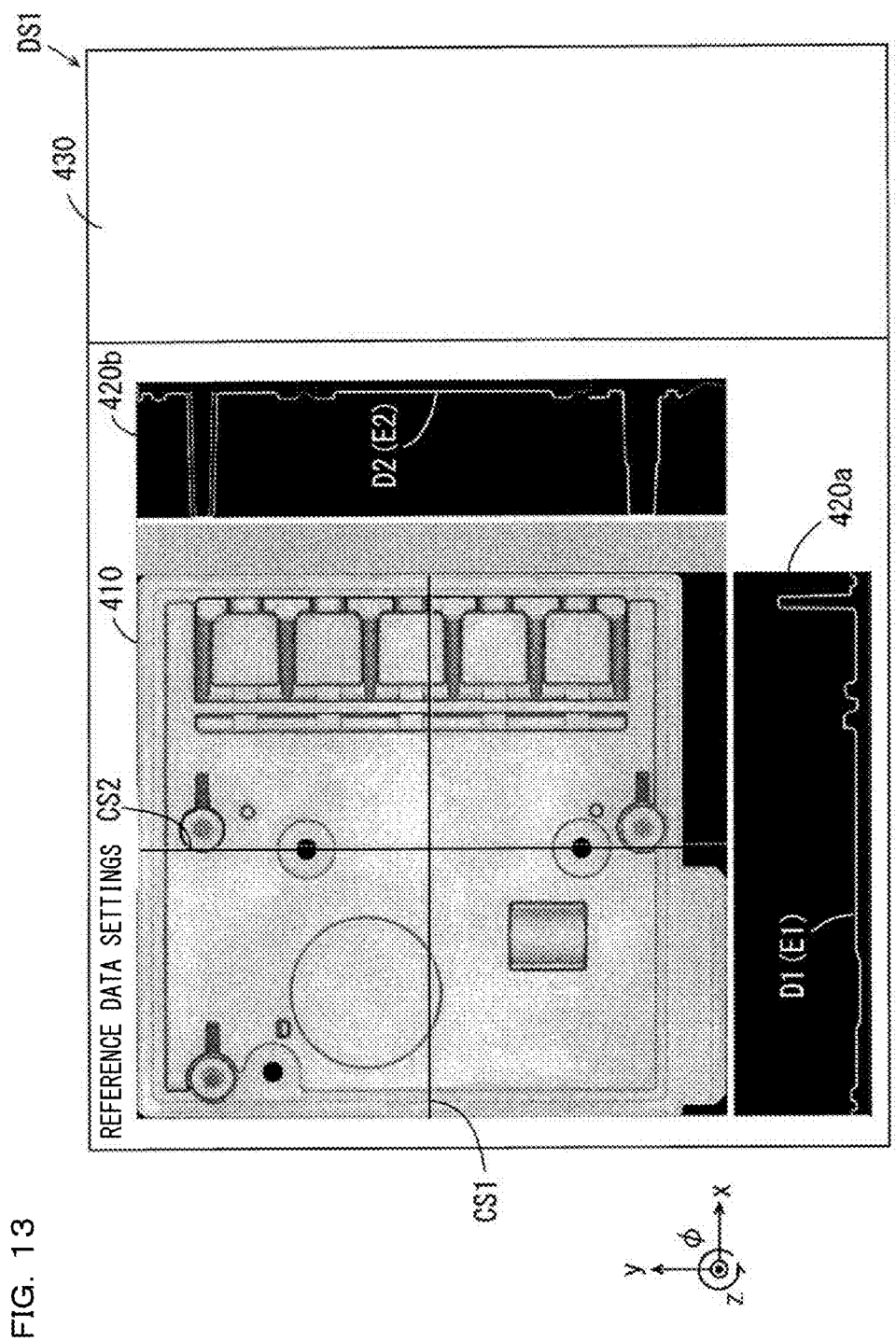
FIG. 13 is a view for explaining the simplified alignment.
Figure 14:
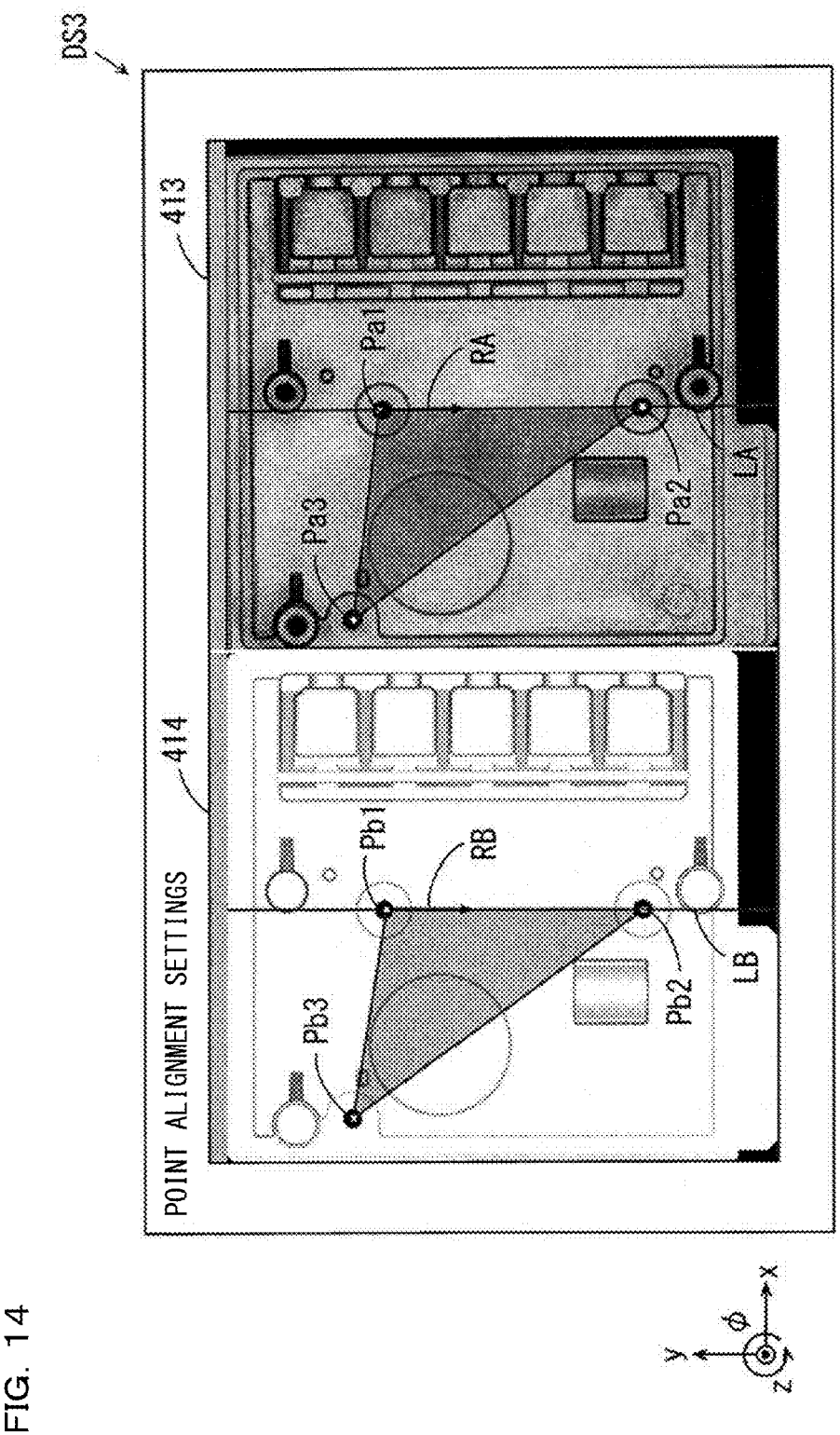
FIG. 14 is a view for explaining the simplified alignment.

FIGS. 12 to 14 are views for explaining the simplified alignment. The simplified alignment is an example of the first alignment. The simplified alignment includes automatic alignment and point specification alignment. One of the automatic alignment and the point specification alignment may be selectively performed, or both of the automatic alignment and the point specification alignment may be sequentially performed.

After the adjustment of the orientation of the reference image as described above, for example, the target image and the reference image are displayed overlapping each other on the image display area 410 of the reference data setting screen DS1 as shown in FIG. 12. In the example of FIG. 12, the texture image is displayed as the target image, and the reference appearance image is displayed as the reference image. In this case, the user can intuitively recognize a deviation between the target image and the reference image. In the case of there being a difference between the measurement target S represented by the target image and the measurement target S represented by the reference image, the user would hardly notice the difference when the target image and the reference image are displayed in parallel. However, displaying these images overlapping with each other allows the user to more easily notice the difference.

In the height display area 420a, in addition to the height display line D1, there is displayed a height display line E1 representing height information of a portion of the reference image which overlaps the cursor CS1. In the height display area 420b, in addition to the height display line D2, there is displayed a height display line E2 representing height information of a portion of the reference image which overlaps the cursor CS2. The height display lines E1, E2 are each generated based on the reference height image data. In order to facilitate discrimination of the height information of the target image and the height information of the reference image, the height display lines D1, D2 and the height display lines E1, E2 are preferably represented with different colors.

On the reference data setting screen DS1, a dialog box DB for selecting whether or not to perform the automatic alignment is displayed. When "YES" is selected in the dialog box DB, the automatic alignment is performed. In the automatic alignment, the pattern matching is performed between the actual height image data and the reference height image data. Based on a result of the pattern matching, the positions of the target image in the x-direction, the y-direction and the z-direction and the orientation of the target image in the ɸ-direction are adjusted. The target range of the pattern matching may be settable by the user, or may be the entire target image. Further, the pattern matching may be performed after thinning of the data for the sake of acceleration. Moreover, the automatic alignment may be performed using a result of the pattern matching performed at the time of selecting the reference height image data. For efficiently performing the automatic alignment, the alignment is preferably performed in the sequence of the alignment in the x-direction, the y-direction and the ɸ-direction, and thereafter, the alignment in the z-direction. The alignment in the z-direction is performed, for example, such that an average height represented by the actual height image data matches an average height represented by the reference height image data in the target range of the pattern matching. On the screen, the target image is enlarged or reduced by movement of the target image in the z-direction.

FIG. 13 shows the reference data setting screen DS1 after the automatic alignment. As in the example of FIG. 13, by the automatic alignment, the matching degree of the target image and the reference image displayed in the image display area 410 increases. Further, the matching degree of the height display line D1 and the height display line E1 displayed in the height display area 420a increases, and the matching degree of the height display line D2 and the height display line E2 displayed in the height display area 420b increases.

In the point specification alignment, a plurality of points are specified on each of the target image and the reference image, and the target image is aligned based on these plurality of points. For example, a point alignment setting screen DS3 of FIG. 14 is displayed. The point alignment setting screen DS3 includes image display areas 413, 414. The target image is displayed in the image display area 413, and the reference image is displayed in the image display area 414. In the example of FIG. 14, the texture image is displayed as the target image, and the reference appearance image is displayed as the reference image. In the present example, three points are specified on each of the target image and the reference image. Specifically, points Pa1, Pa2, Pa3 are specified on the target image in the image display area 413, and points Pb1, Pb2, Pb3 are specified on the reference image in the image display area 414. The points Pa1, Pa2, Pa3 respectively correspond to the points Pb1, Pb2, Pb3. These points are preferably characteristic points of the measurement target S. These points may be specified by the user, or may be automatically specified based on the actual height image data and the reference height image data.

Further, in the image display area 413, a straight line LA passing through the points Pa1, Pa2 and an arrow RA pointing from the point Pa1 toward the point Pa2 are displayed. In the image display area 414, a straight line LB passing through the points Pb1, Pb2 and an arrow RB pointing from the point Pb1 toward the point Pb2 are displayed.

When these points are specified, first, the target image is moved in the x-direction and the y-direction such that the point Pa1 matches the point Pb1. Subsequently, the target image is rotated in the ɸ-direction such that the straight line LA and the straight line LB match and that the direction of the arrow RA and the direction of the arrow RB match. Lastly, the position and the tilt of the target image in the z-direction are adjusted such that a plane including the points Pa1, Pa2, Pa3 matches a plane including the points Pb1, Pb2, Pb3. Specifically, in the height image coordinate system, the target image is corrected such that the plane including the points Pa1, Pa2, Pa3 matches the plane including the points Pb1, Pb2, Pb3. The respective heights (z coordinates) of the points Pa1, Pa2, Pa3 are represented by the actual height image data, and the respective heights (z coordinates) of the points Pb1, Pb2, Pb3 are represented by the reference height image data. Thereby, as in the example of FIG. 13, the matching degree of the target image and the reference image displayed in the image display area 410 increases.

(7-2) Advanced Alignment

In the advanced alignment, the reference position is specified for the measurement target S, and the alignment is performed with the reference position taken as a reference. The advanced alignment is an example of the second alignment. FIGS. 15 to 18 are views for explaining the advanced alignment. The advanced alignment includes tilt alignment, xy alignment, and height offset alignment. One or two of the tilt alignment, the xy alignment, and the height offset alignment may be selectively performed, or all of these may be sequentially performed. When the tilt alignment, the xy alignment, and height offset alignment are sequentially performed, it is preferable that the tilt alignment be performed first, the xy alignment be performed next, and the height offset alignment be performed last.

Figure 15:
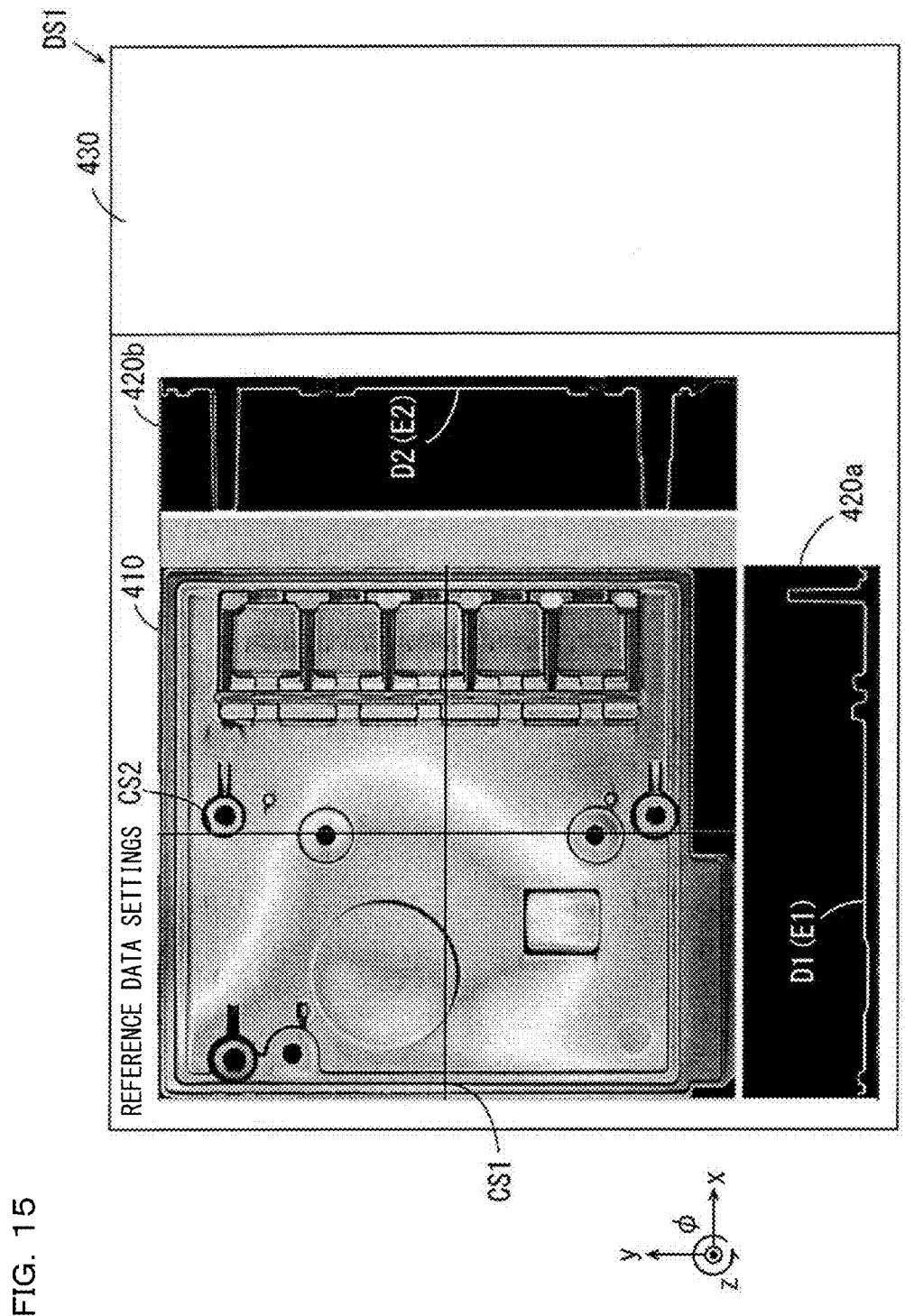
FIG. 15 is a view for explaining advanced alignment.

FIG. 15 shows an example of the reference data setting screen DS1 after the above simplified alignment is performed. In the example of FIG. 15, a height image representing a difference between the actual height image data and the reference height image data (hereinafter referred to as a difference height image) is displayed in the image display area 410. The difference height image represents the difference between the height information of the actual height image data and the height information of the reference height image data by use of colors. For example, a portion with the largest difference is represented by red, and a portion with the smallest difference is represented by blue. Other portions are each represented by an intermediate color between red and blue in accordance with the difference. By seeing the difference height image, the user can recognize the tilt of the target image with respect to the reference image.

Figure 16:
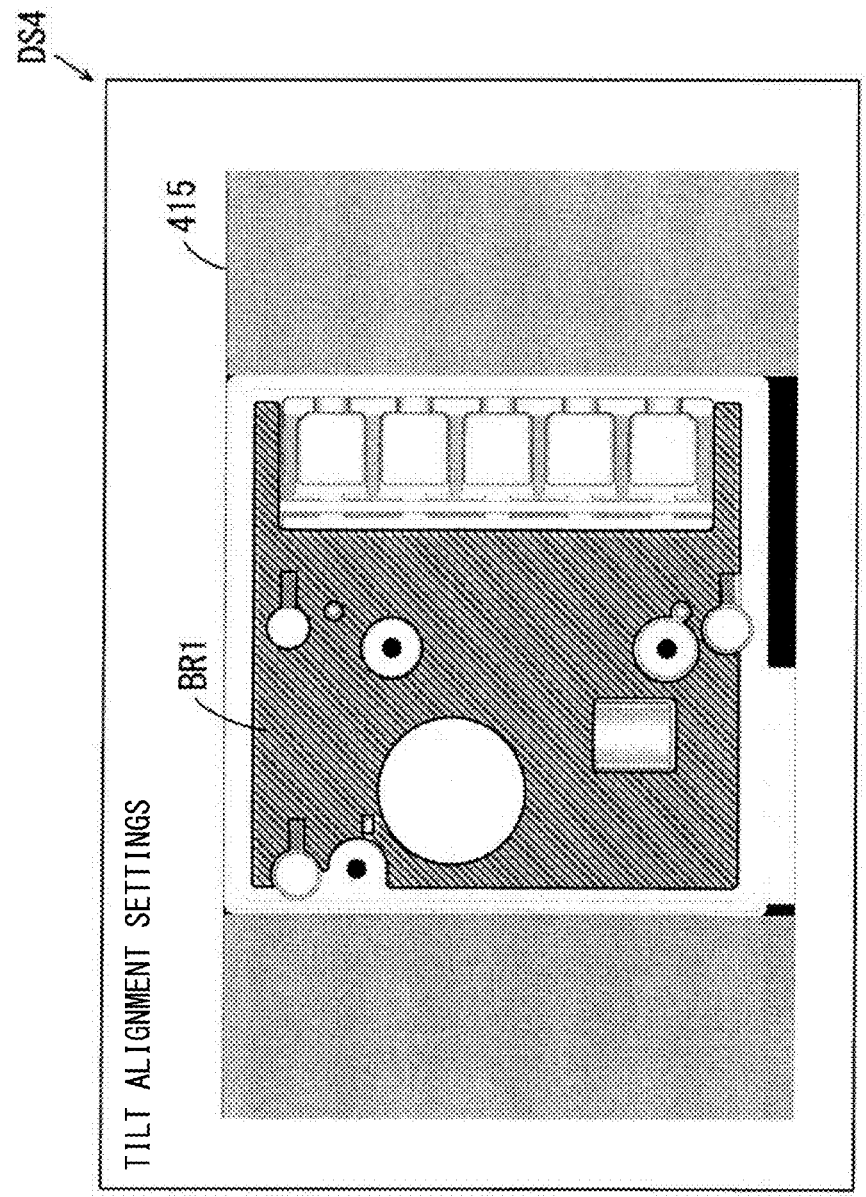
FIG. 16 is a view for explaining the advanced alignment.

In the tilt alignment, for example, a tilt alignment setting screen DS4 of FIG. 16 is displayed. The tilt alignment setting screen DS4 includes an image display area 415. In the image display area 415, the reference image is displayed. In the example of FIG. 16, the reference appearance image is displayed as the reference image. On the reference image, an area BR1 is set as the reference position. In FIG. 16, the area BR1 is hatched. When the area BR1 is set, an area of the target image which overlaps the area BR1 (hereinafter referred to as an overlapping area) is specified. Note that, in contrast to the present example, an area as the reference position may be set on the target image. In that case, the area of the reference image which overlaps the set area is specified.

Based on the actual height image data and the reference height image data, the position of the target image in the z-direction is adjusted so as to make high the matching degree of the height of the overlapping area and the height of the area BR1. Specifically, the position of the target image in the rotational direction around the axis intersecting with the z-axis is adjusted. When there is a distortion (e.g., a sink mark) in molding in the overlapping area of the target image, a difference remains between the area BR1 and the overlapping area by an amount corresponding to the distortion.

Figure 17:
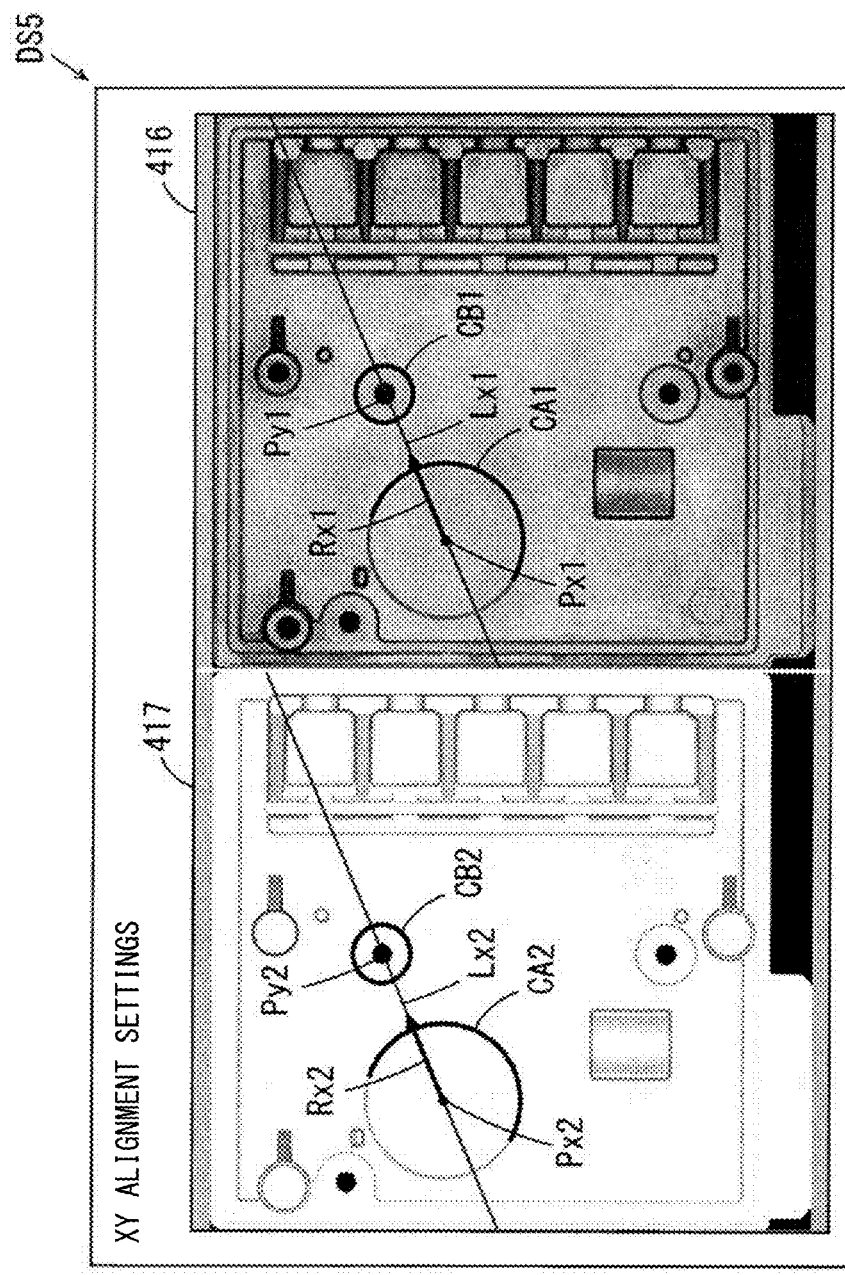
FIG. 17 is a view for explaining the advanced alignment.

In the xy alignment, for example, an xy alignment setting screen DS5 of FIG. 17 is displayed. The xy alignment setting screen DS5 includes image display areas 416, 417. The target image is displayed in the image display area 416, and the reference image is displayed in the image display area 417. In the example of FIG. 17, the texture image is displayed as the target image, and the reference appearance image is displayed as the reference image.

For example, as the reference positions, an arc CA1 and a circle CB1 are specified on the target image, and an arc CA2 and a circle CB2 are specified on the reference image. The arcs CA1, CA2 overlap a common circular portion of the measurement target S, and the circles CB1, CB2 overlap another common circular portion of the measurement target S.

Further, a straight line Lx1 passing through a center point Px1 of the arc CA1 and a center point Py1 of the circle CB1 is set, and a straight line Lx2 passing through a center point Px2 of the arc CA2 and a center point Py2 of the circle CB2 is set. Further, an arrow Rx1 pointing in one direction is set on the straight line Lx1, and an arrow Rx2 pointing in one direction is set on the straight line Lx2.

When the settings as thus described are performed, for example, the positions of the target image in the x-direction and the y-direction are adjusted such that the point Px1 and the point Px2 match. Further, the target image is rotated in the φ-direction such that the straight line Lx1 and the straight line Lx2 match and that the direction of the arrow Rx1 and the direction of the arrow Rx2 match.

Figure 18:
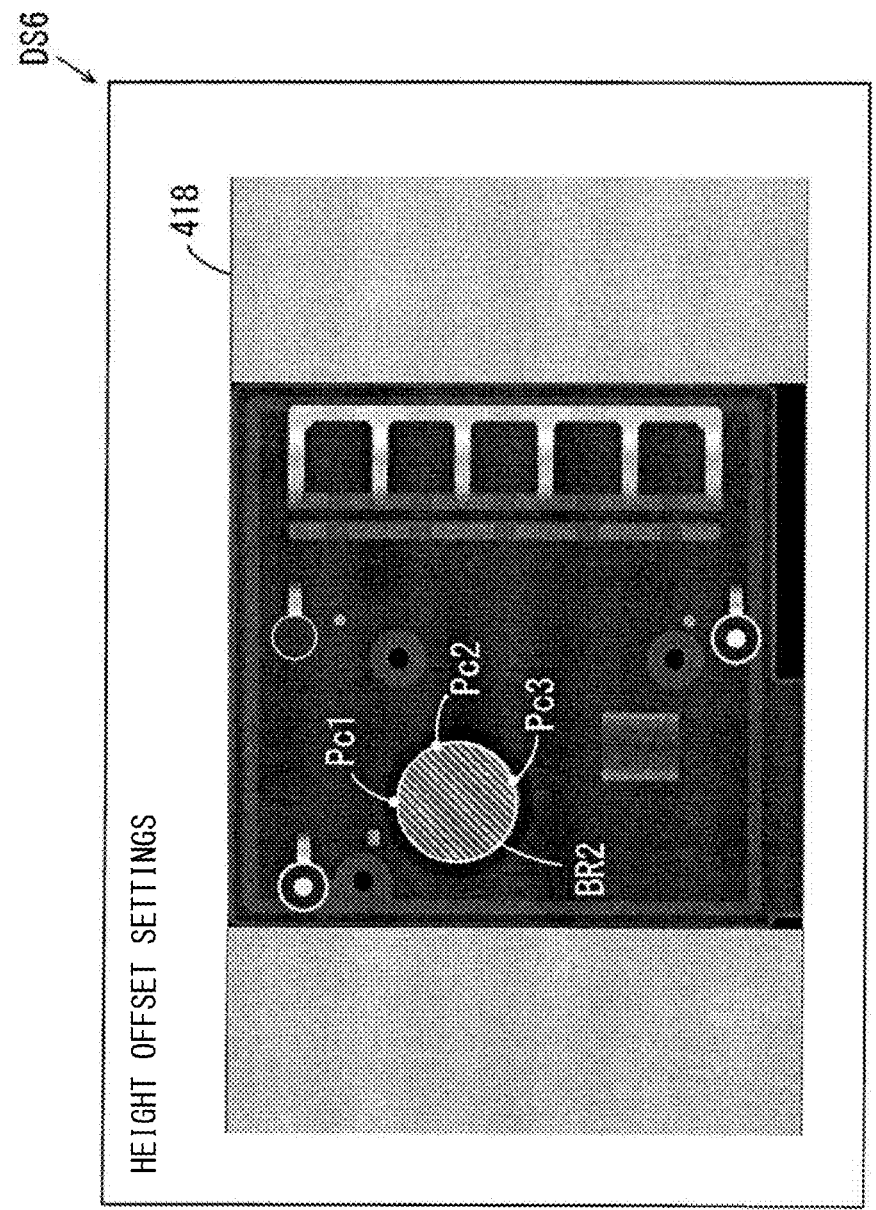
FIG. 18 is a view for explaining the advanced alignment.

In the height offset alignment, for example, a height offset alignment setting screen DS6 of FIG. 18 is displayed. The height offset alignment setting screen DS6 includes an image display area 418. In the image display area 418, the reference image is displayed. In the example of FIG. 18, the reference height image is displayed as the reference image. On the reference image, three points Pc1, Pc2, Pc3 are specified, thereby to specify a circular area BR2 as the reference position. The area BR2 is a circular portion of the measurement target S in which the arc CA2 of FIG. 17 has been set. Further, an area of the target image which overlaps the area BR2 (an overlapping area) is specified. Note that, in contrast to the present example, an area as the reference position may be set on the target image. In that case, the area of the reference image which overlaps the set area is specified. Based on the actual height image data and the reference height image data, the position of the target image in the z-direction is adjusted so as to make high the matching degree of the height of the overlapping area and the height of the area BR2.

By sequentially performing the tilt alignment, the xy alignment, and the height offset alignment as thus described, the alignment can be performed with very high accuracy concerning a specific portion of the measurement target S. In the present example, the area BR2 of FIG. 18 corresponds to the specific portion.

(8) Comparative Measurement

Figure 19:
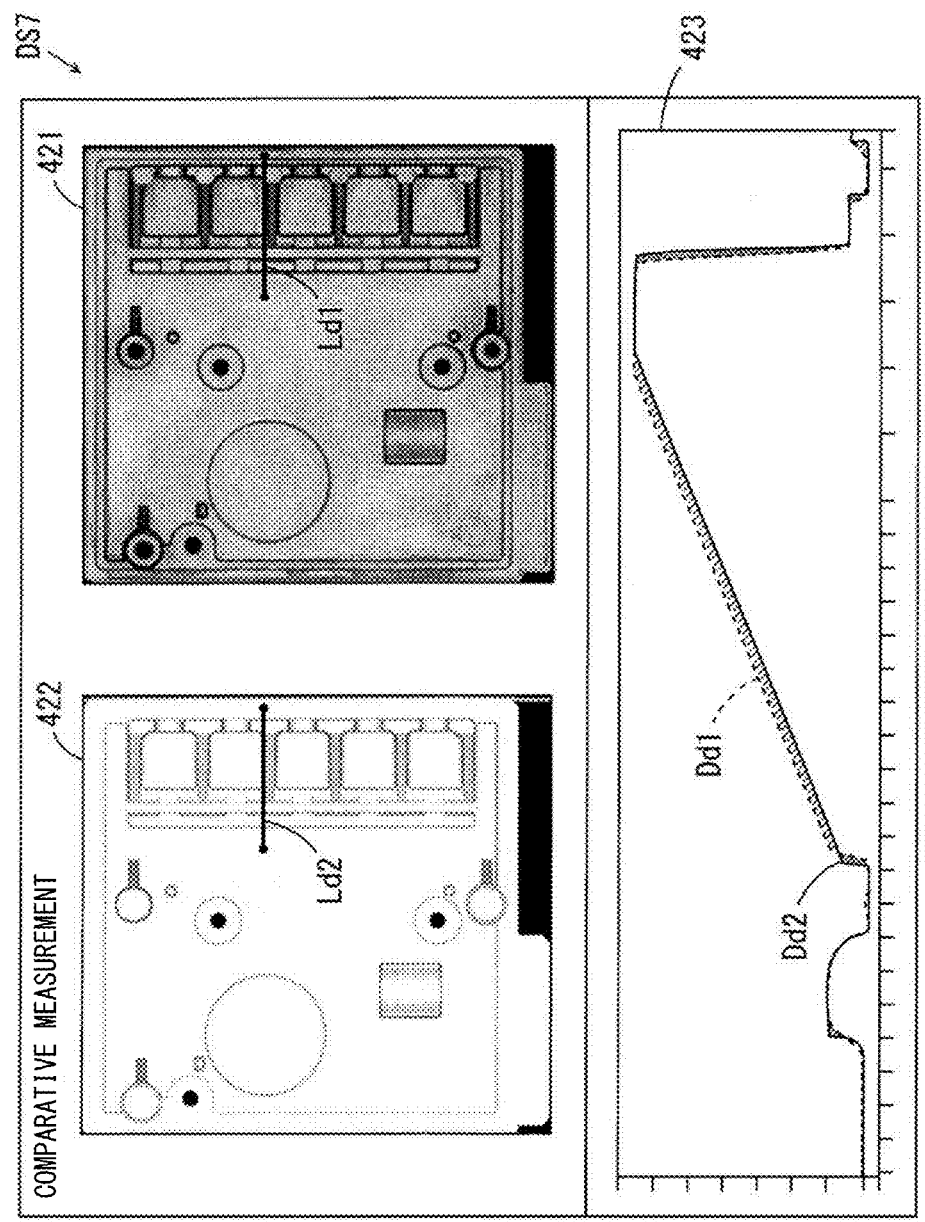
FIG. 19 is a view for explaining comparative measurement.
Figure 20:
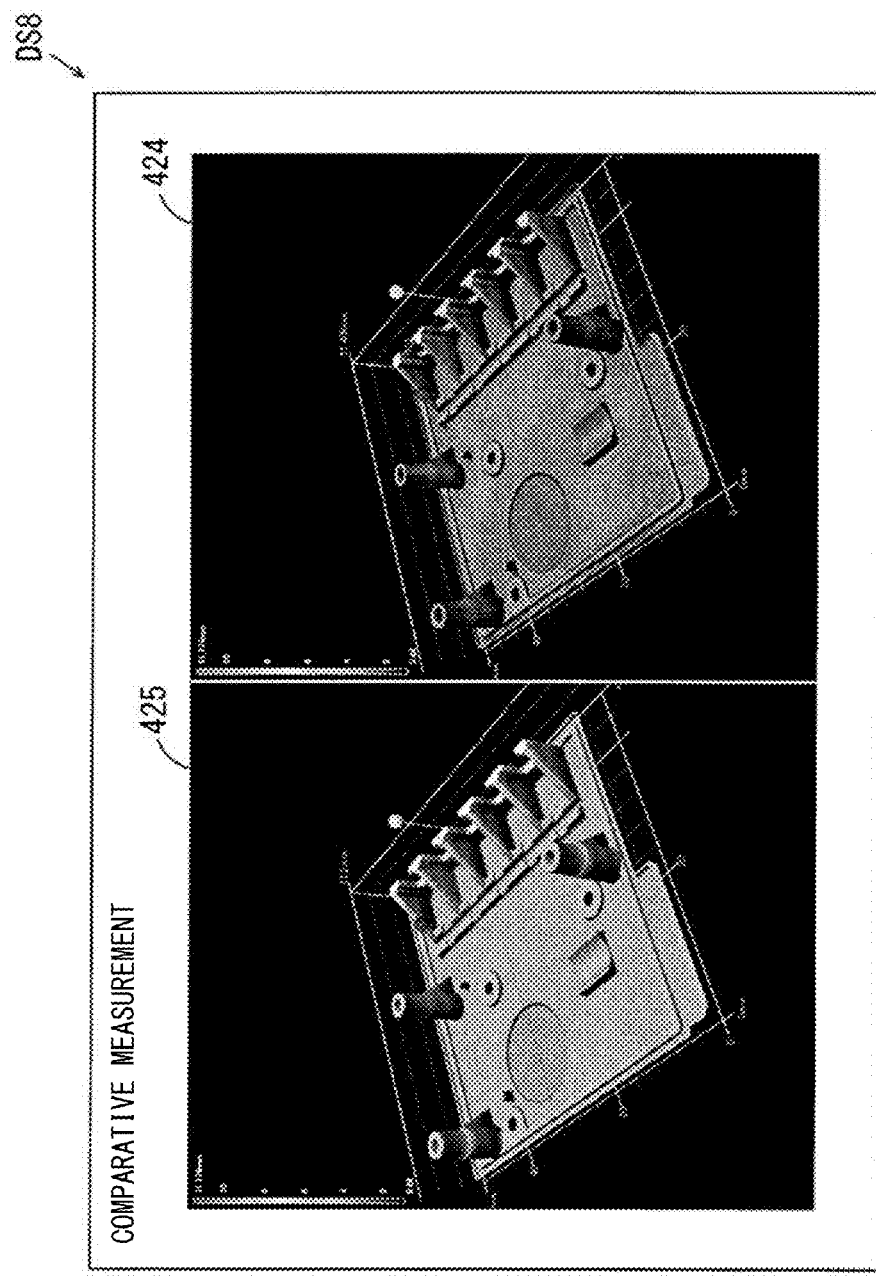
FIG. 20 is a view for explaining the comparative measurement.

After the target image and the reference image are aligned as described above, comparative measurement of an actual size of the measurement target S and a design size represented by the CAD data is performed based on the target image data and the reference image data. FIGS. 19 and 20 are views for explaining the comparative measurement.

For example, a comparative measurement screen DS7 of FIG. 19 is displayed. The comparative measurement screen DS7 includes image display areas 421, 422 and a comparison result display area 423. The target image is displayed in the image display area 421, and the reference image is displayed in the image display area 422. In the example of FIG. 19, the texture image is displayed as the target image, and the reference appearance image is displayed as the reference image.

A measurement place is specified on each of the target image and the reference image. For example, a line segment Ld1 is set on the target image, and a line segment Ld2 is set on the reference image. The line segments Ld1, Ld2 represent a common measurement place for the measurement target S. In this case, when the measurement place is specified on one image, the measurement place may be automatically specified in a corresponding place on the other image. For example, when the line segment Ld1 is set on the target image, the line segment Ld2 is automatically set on the reference image. Further, a comparative measurement screen DS8 of FIG. 20 may be displayed. The comparative measurement screen DS8 of FIG. 20 includes image display areas 424, 425. A three-dimensional image based on the actual height image data is displayed in the image display area 424, and a three-dimensional image based on the reference height image data is displayed in the image display area 425. In the comparative measurement screen DS8, setting, checking and the like of the measurement place may be performed.

In the comparison result display area 423 of FIG. 19, there is displayed information showing a deviation between the measurement place represented by the actual height image data and the measurement place represented by the reference height image data (hereinafter referred to as deviation information). In the example of FIG. 19, as the deviation information, there are displayed a height display line Dd1 representing height information of a portion of the target image which overlaps the line segment Ld1, and a height display line Dd2 representing height information of a portion of the reference image which overlaps the line segment Ld2. The height display line Dd1 is generated based on the actual height image data, and the height display line Dd2 is generated based on the reference height image data. For example, the height display line Dd1 and the height display line Dd2 are displayed with different colors. In FIG. 19, the height display line Dd1 is represented by a dotted line, and the height display line Dd2 is represented by a solid line.

Further, a color may be provided between the height display line Dd1 and the height display line Dd2 such that a deviation between the height display line Dd1 and the height display line Dd2 can be readily recognized. Moreover, different colors may be provided to a portion in which the height represented by the height display line Dd1 is larger than the height represented by the height display line Dd2 (a portion in which the height display line Dd1 is located above the height display line Dd2), and to a portion in which the height represented by the height display line Dd1 is smaller than the height represented by the height display line Dd2 (a portion in which the height display line Dd1 is located below the height display line Dd2). In FIG. 19, a portion between the height display line Dd1 and the height display line Dd2 is hatched. Further, different types of hatching are provided to the portion in which the height represented by the height display line Dd1 is larger than the height represented by the height display line Dd2, and to the portion in which the height represented by the height display line Dd1 is smaller than the height represented by the height display line Dd2.

As the deviation information, the maximum value and the minimum value of heights represented by each of the actual height image data and the reference height image data may be displayed. Differences between these maximum values and minimum values may be displayed. An average of the heights represented by each of the actual height image data and the reference height image data may be displayed. Further, there may be displayed the maximum value, the minimum value, or an average value of differences between the height display line Dd1 and the height display line Dd2.

(9) Measurement Target Measuring Processing

Figure 21:
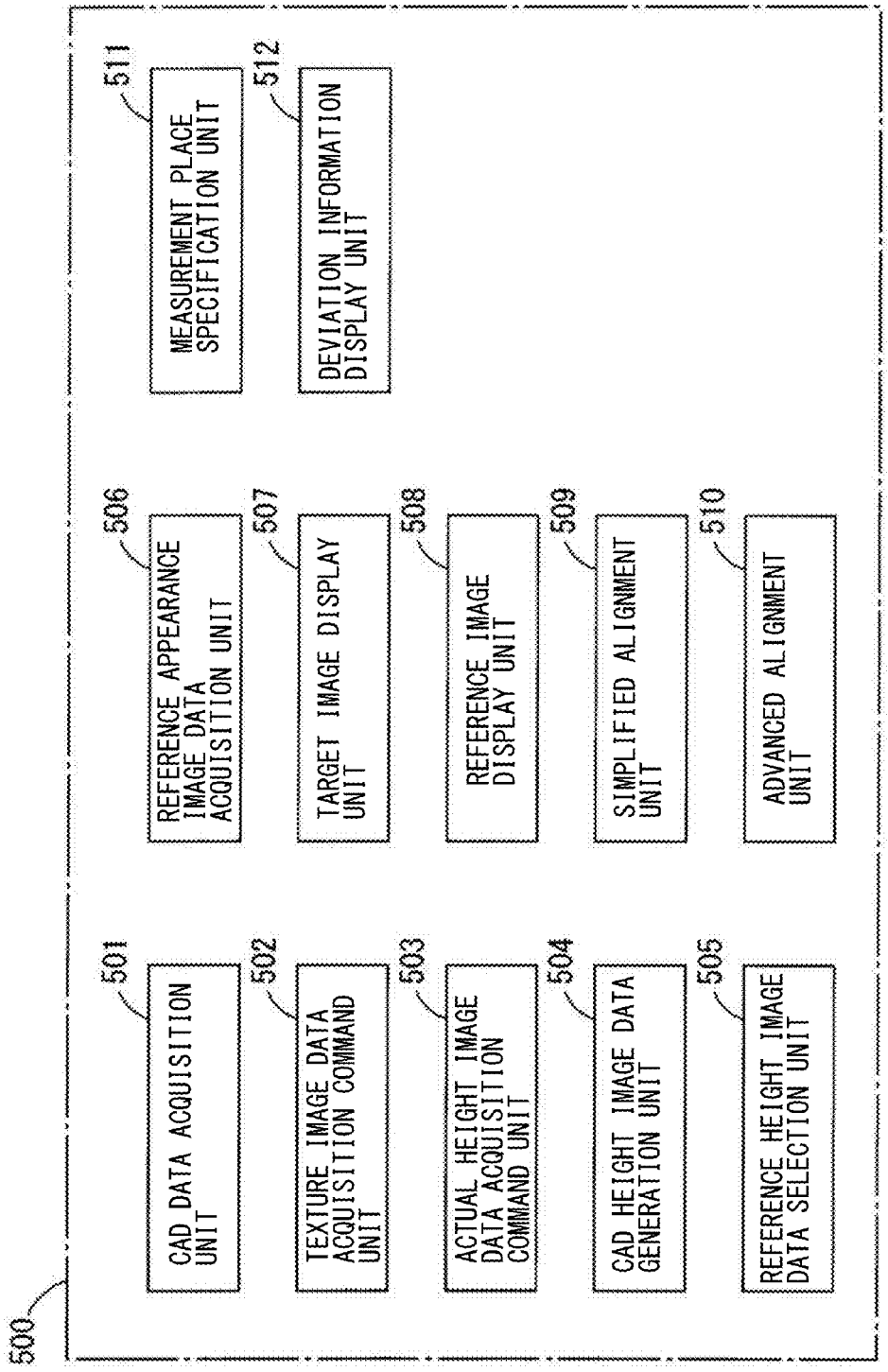
FIG. 21 is a block diagram showing a functional configuration of the magnifying observation device.

FIG. 21 is a block diagram showing a functional configuration of the magnifying observation device 500. As illustrated in FIG. 21, the magnifying observation device 500 includes a CAD data acquisition unit 501, a texture image data acquisition command unit 502, an actual height image data acquisition command unit 503, a CAD height image data generation unit 504, a reference height image data selection unit 505, a reference appearance image data acquisition unit 506, a target image display unit 507, a reference image display unit 508, a simplified alignment unit 509, an advanced alignment unit 510, a measurement place specifying unit 511, and a deviation information display unit 512.

These functions are achieved by the CPU 210 of FIG. 1 executing the measurement target measuring program stored into the ROM 220 or the storage device 240.

The CAD data acquisition unit 501 acquires CAD data of the measurement target S to be stored into the storage device 240 of FIG. 1 (hereinafter referred to as basic CAD data). The texture image data acquisition command unit 502 gives a command to the measuring part 100 and the control part 300 of FIG. 1 to acquire texture image data of the measurement target S. The actual height image data acquisition command unit 503 gives a command to the measuring part 100 and the control part 300 of FIG. 1 to acquire actual height image data. The CAD height image data generation unit 504 generates a plurality of pieces of CAD height image data (cf. FIG. 9) based on the basic CAD data. The reference height image data selection unit 505 selects reference height image data from the plurality of pieces of CAD height image data. The reference appearance image data acquisition unit 506 acquires a reference appearance image corresponding to the reference height image data.

The target image display unit 507 makes a display part 400 of FIG. 1 display a target image, and the reference image display unit 508 makes the display part 400 of FIG. 1 display a reference image. The simplified alignment unit 509 performs simplified alignment of the target image and the reference image, and the advanced alignment unit 510 performs advanced alignment of the target image and the reference image. The measurement place specifying unit 511 specifies the measurement place for the measurement target S based on the operation of the operation part 250 of FIG. 1. The deviation information display unit 512 makes the display part 400 of FIG. 1 display information (deviation information) showing a deviation between the measurement place represented by the actual height image data and the measurement place represented by the reference height image data.

Figure 22:
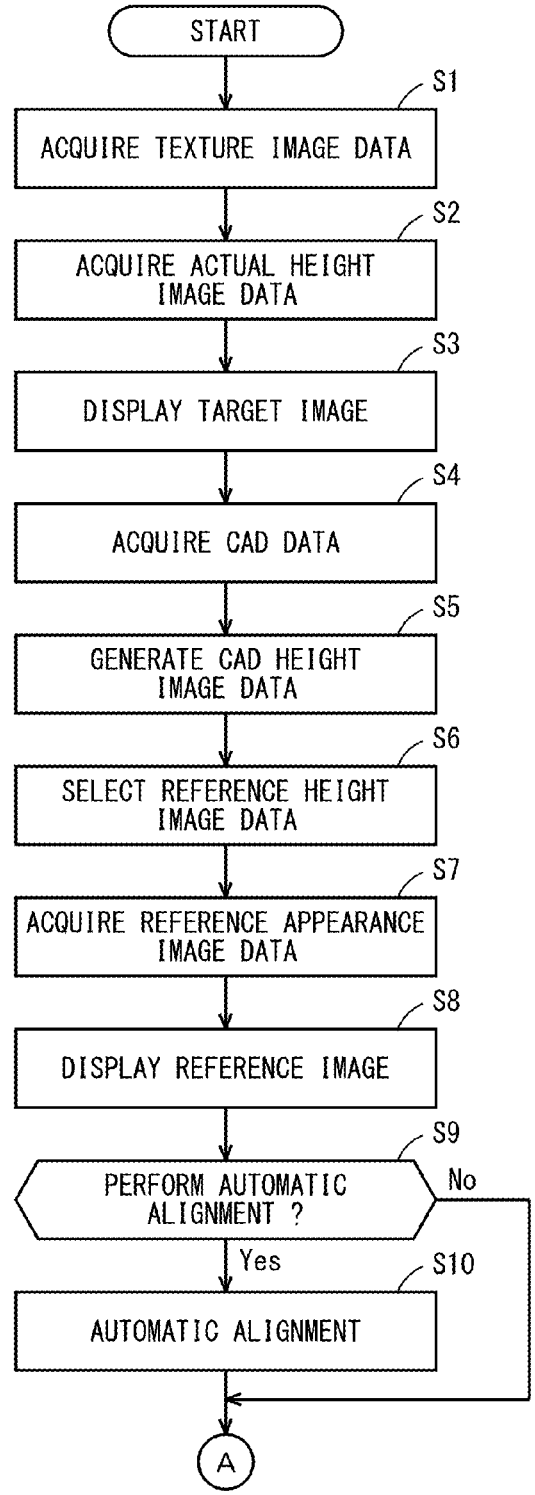
FIG. 22 is a flowchart showing one example of measurement target measuring processing.
Figure 23:
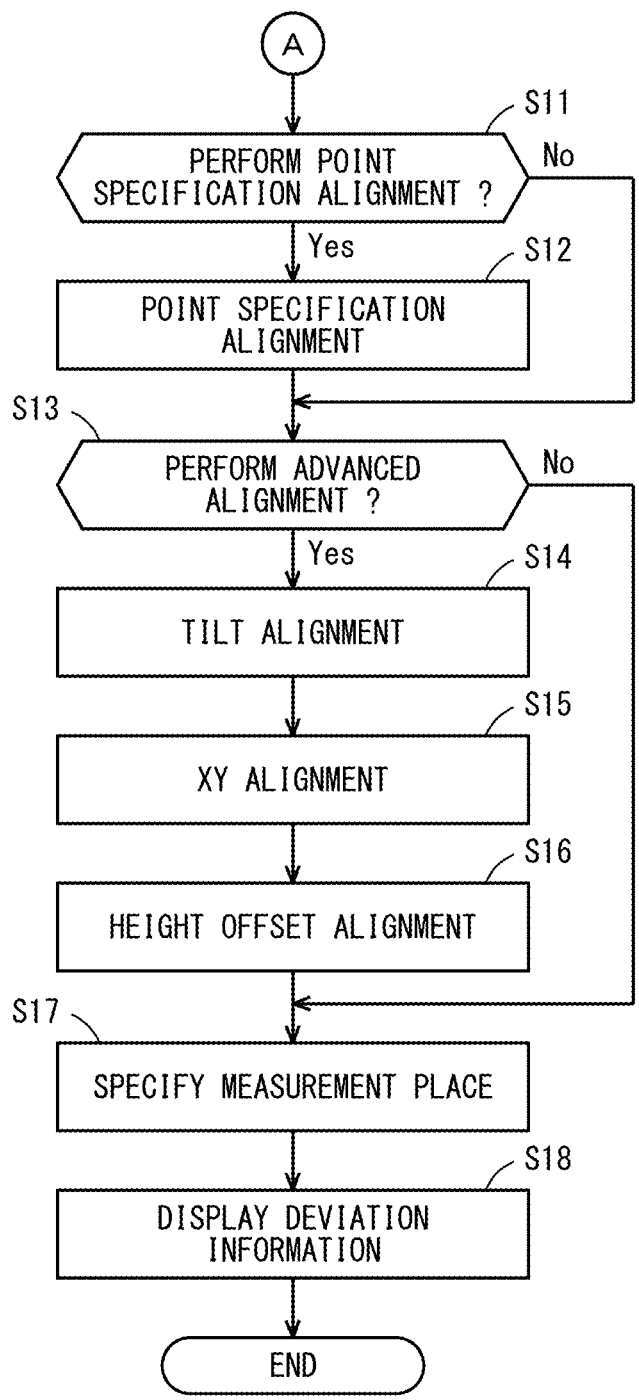
FIG. 23 is a flowchart showing one example of the measurement target measuring processing.

Hereinafter, control operation of the CPU 210 will be described. The measurement target measuring processing is performed by the CPU 210 executing the measurement target measuring program stored into the ROM 220 or the storage device 240. FIGS. 22 and 23 are flowcharts each showing one example of the measurement target measuring processing.

First, the CPU 210 gives a command to the measuring part 100 and the control part 300, to acquire texture image data (Step S1), and also acquire actual height image data (Step S2). Next, the CPU 210 makes the display part 400 display a target image (a texture image or an actual height image) based on the acquired actual image data (the texture image data or the actual height image data) (Step S3). Subsequently, the CPU 210 acquires basic CAD data of the measurement target S from the storage device 240 (Step S4), and generates a plurality of pieces of CAD height image data based on the basic CAD data (Step S5). Note that a plurality of pieces of CAD height image data corresponding to respective pieces of basic CAD data may be previously generated, and those pieces of CAD height image data may be stored into the storage device 240.

Subsequently, from the plurality of pieces of CAD height image data, the CPU 210 selects, as reference height image data, CAD height image data with the highest matching degree with respect to the actual height image data (Step S6). Then, based on the basic CAD data, the CPU 210 acquires reference appearance image data representing the appearance of the measurement target S seen in a direction corresponding to the selected reference height image data (Step S7).

Next, the CPU 210 makes the display part 400 display a reference image (a reference appearance image or a reference height image) based on the reference image data (the reference appearance image data or the reference height image data) (Step S8). In this case, it is preferable to display a reference image with its orientation adjusted with respect to the target image.

Next, the CPU 210 determines whether or not to perform automatic alignment as the simplified alignment based on the user's operation (Step S9). For example, when "Yes" is selected in the dialog box DB of FIG. 12, the CPU 210 performs the automatic alignment by pattern matching (Step S10), and when "No" is selected, the CPU 210 skips Step S10. Subsequently, the CPU 210 determines whether or not to perform point specification alignment as the simplified alignment based on the user's operation (Step S11). For example, as in the example of FIG. 12, a dialog box for selecting whether or not to perform the point specification alignment is displayed. Alternatively, in the setting display area 430 of the reference data setting screen DS1, whether or not to perform the point specification alignment may be selected. When the point specification alignment is to be performed, the CPU 210 accepts a plurality of points specified by the user on the target image and the reference image, and performs the point specification alignment based on the plurality of points (Step S12). When the point specification alignment is not to be performed, the CPU 210 skips Step S12.

Next, the CPU 210 determines whether or not to perform advanced alignment based on the user's operation (Step S13). For example, in the setting display area 430 of the reference data setting screen DS1, whether or not to perform the advanced alignment is selected. When the advanced alignment is to be performed, the CPU 210 sequentially performs the tilt alignment, the XY alignment, and the height offset alignment described above with the specified reference position taken as a reference (Steps S14 to S16). Note that just one or two of the tilt alignment, the XY alignment, and the height offset alignment may be selectively performed. When the advanced alignment is not to be performed, the CPU 210 skips Steps S14 to S16.

Next, the CPU 210 specifies the measurement place for the measurement target S based on the user's operation (Step S17). Subsequently, the CPU 210 makes the display part 400 display deviation information based on the actual height image data and the reference height image data (Step S18). Thereby, the measurement target measuring processing is completed.

(10) Effects

In the magnifying observation device 500 according to the present embodiment, from a plurality of pieces of CAD height image data generated based on basic CAD data, CAD height image data with the highest matching degree with respect to actual height image data is selected as reference height image data, and reference appearance image data corresponding to the reference height image data is acquired. A reference image based on one of the reference height image data and the reference appearance image data is displayed along with a target image based on one of texture image data and the actual height image data, and the target image and the reference image are aligned by pattern matching as automatic alignment. In this case, the user is not required to perform specification of a direction and the like on the basic CAD data. This facilitates the user to make a comparison between the target image and the reference image without performing complex operation.

Further, when a measurement place for the measurement target is specified, there is displayed information showing a deviation between the measurement place represented by the actual height image data and the measurement place represented by the reference height image data. In this case, the user can readily and accurately specify the measurement place based on the mutually aligned target image and reference image. Moreover, the user can readily and intuitively recognize the deviation between the actual height image data and the CAD data concerning a specific portion of the measurement target.

(11) Other Embodiments (11-1)

In the above embodiment, the automatic alignment by the pattern matching is performed after the target image is displayed, but the present invention is not restricted thereto. The target image may be displayed after the automatic alignment is internally performed. In this case, the processing efficiency can further be improved.

(11-2)

In the above embodiment, six CAD height images are generated from one CAD data, but the number of pieces of generated CAD height image data is not restricted thereto. Not more than five or not less than seven pieces of CAD height image data may be generated. For example, as for the measurement target S having a shape so simple as to be observed in limited directions, the number of pieces of generated CAD height image data may be small. As for the measurement target S having a shape so complex as to be assumed to be observed in every direction, the number of pieces of generated CAD height image data is preferably large.

Further, in the above embodiment, the pieces of CAD height image data of the measurement target S seen in directions parallel to the X'-axis, the Y'-axis, and the Z'-axis which correspond to the CAD data are generated, but the CAD height image data may be generated irrespective of these axes.

(11-3)

In the above embodiment, before the simplified alignment, the reference image is moved with respect to the target image, and the target image is moved with reference to the reference image in the simplified alignment and the advanced alignment, but the present invention is not restricted thereto. The target image may be moved with respect to the reference image before the simplified alignment, and the reference image may be moved with respect to the target image in the simplified alignment and the advanced alignment. However, in order not to give the user a feeling of strangeness, the target image and the reference image are preferably moved as in the above embodiment.

(11-4)

In the above embodiment, the texture image data and the actual height image data are acquired for displaying the target image, and the reference appearance image data and the reference height image data are acquired for displaying the reference image, but the present invention is not restricted thereto. The texture image data or the reference appearance image data may not be acquired. In this case, the texture image or the reference appearance image is not displayed, and only the actual height image and the reference height image are displayed.

(11-5)

In the above embodiment, the actual height image data including the height information of the measurement target S is acquired by the triangular ranging system using the optical cutting method or the pattern projection method, but the present invention is not restricted thereto. The actual height image data may be acquired by another system. For example, the actual height image data may be acquired by the time-of-flight method, the confocal method, the photometric stereo method, the calibrated stereo method, the photogrammetric method, the lens focus method, or the like.

(12) Corresponding Relation Between Each Constituent of Claims and Each Part of Embodiment Hereinafter, examples of the correspondence between each constituent of the claims and each part of the embodiment will be described, but the present invention is not restricted to the following examples.

In the above embodiment, the magnifying observation device 500 is an example of the magnifying observation device, the measurement target S is an example of the measurement target, the stage 141 is an example of the stage, the measurement head 100H is an example of the height image data acquisition unit, the storage device 240 is an example of the storage part, the display part 400 is an example of the display part, the operation part 250 is an example of the operation part, the CPU 210 is an example of the information processing part, the CAD data acquisition unit 501 is an example of the CAD data acquisition unit, the actual height image data acquisition command unit 503 is an example of the acquisition command unit, the CAD height image data generation unit 504 is an example of the CAD height image data generation unit, the reference height image data selection unit 505 is an example of the reference height image data selection unit, the target image display unit 507 is an example of the target image display unit, the reference image display unit 508 is an example of the reference image display unit, the simplified alignment unit 509 is an example of the alignment performing unit, the measurement place specifying unit 511 is an example of the measurement place specifying unit, and the deviation information display unit 512 is an example of the deviation information display unit.

A variety of other constituents having the configuration or the function recited in the claims may be used as the constituents of the claims.

The present invention can be effectively used for comparison between CAD data and other image data.

What is claimed is:

1. A measurement target measuring method, comprising:
   acquiring three-dimensional CAD data representing a measurement target;
   acquiring actual height image data that includes as height information a distance from a reference position to each part on the surface of the measurement target in one direction;
   generating a plurality of pieces of CAD height data that each include distances from a reference position to respective parts on the surface of the measurement target in a plurality of directions on the basis of the CAD data;
   selecting, from the plurality of pieces of CAD height data, CAD height data with the highest matching degree with respect to the actual height image data, as reference height data;
   displaying as a target image a first image based on the actual height image data or a second image corresponding to the first image, and displaying as a reference image a third image based on the reference height data or a fourth image corresponding to the third image;
   performing alignment of the target image and the reference image as first alignment by pattern matching;
   specifying a measurement place for the measurement target; and
   displaying information that shows a deviation between the measurement place represented by the actual height image data and the measurement place represented by the reference height data.

2. The method according to claim 1, wherein
   the plurality of directions include first, second, third, fourth, fifth and sixth directions,
   the first and second directions are parallel and reversed to each other, the second and third directions are parallel and reversed to each other, the fifth and sixth directions are parallel and reversed to each other,
   the third and fourth directions are respectively orthogonal to the first and second directions, and
   the fifth and sixth directions are respectively orthogonal to the first and second directions and respectively orthogonal to the third and fourth directions.

3. The method according to claim 2, wherein
   in a three-dimensional coordinate system corresponding to the CAD data, first, second and third axes are set, and
   the first and second directions are parallel to the first axis, the third and fourth directions are parallel to the second axis, and the fifth and sixth directions are parallel to the third axis.

4. The method according to claim 1, further comprising, displaying the reference image before the step of performing the first alignment.

5. The method according to claim 4, wherein the reference image is moved with respect to the target image before the step of performing the first alignment, and the target image is moved with respect to the reference image in the step of performing the first alignment.

6. The method according to claim 1, further comprising, changing an orientation of the target image.

7. The method according to claim 1, wherein
   in a three-dimensional coordinate system corresponding to the actual height image data and the reference height data, a fourth axis parallel to the one direction or a direction corresponding to the reference height data, and fifth and sixth axes orthogonal to each other on a plane vertical to the fourth axis are separately defined, and
   the step of performing the first alignment includes
   a parallel position adjustment step of performing alignment in a direction parallel to the fifth and six axes, and alignment in a rotating direction around an axis parallel to the fourth axis, and
   a height adjustment step of performing alignment in a direction parallel to the fourth axis after the parallel position adjustment step.

8. The method according to claim 1, further comprising, displaying a CAD image based on the basic CAD data before the step of selecting the reference height data.

9. The method according to claim 1, further comprising, specifying a reference position of the measurement target after the step of performing the first alignment, and performing alignment of the target image and the reference image as second alignment with the reference position taken as a reference.

10. The method according to claim 9, wherein
in a three-dimensional coordinate system corresponding to the actual height image data and the reference height data, a fourth axis parallel to the one direction or a direction corresponding to the reference height data, and fifth and sixth axes orthogonal to each other on a plane vertical to the fourth axis are separately defined, and
in the step of performing the second alignment, at least one of alignment in a rotating direction around an axis parallel to the fourth axis, alignment in a direction parallel to the fifth and six axes, and alignment in a direction parallel to the fourth axis is performed.

11. The method according to claim 1, wherein in the step of displaying the reference image, the reference image with an orientation adjusted with respect to the target image is first displayed.

12. The method according to claim 1, further comprising, acquiring actual appearance image data representing an appearance of the measurement target which is obtained by imaging in the one direction, and
the second image is an image based on the actual appearance image data.

13. The method according to claim 1, further comprising, displaying the target image and the reference image with overlapping each other.

14. The method according to claim 1, further comprising, displaying the target image and the reference image in parallel.

15. The method according to claim 1, wherein displaying the deviation is provided with displaying the deviation with the target image and the reference image in parallel.

16. The method according to claim 1, wherein the displaying the first or second image and displaying the third or fourth image include displaying the first or second image and the third or fourth image in parallel, and displaying the deviation includes displaying the target image and the reference image with overlapping each other.

17. The method according to claim 1, wherein the performing alignment is performing alignment automatically.

18. A non-transitory computer readable medium storing a program to cause a computer to execute measurement target measuring method comprising the steps of:
acquiring three-dimensional CAD data representing a measurement target;
acquiring actual height image data that includes as height information a distance from a reference position to each part on the surface of the measurement target in one direction;
generating a plurality of pieces of CAD height data that each include distances from a reference position to respective parts on the surface of the measurement target in a plurality of directions on the basis of the CAD data;
selecting, from the plurality of pieces of CAD height data, CAD height data with the highest matching degree with respect to the actual height image data, as reference height data;
displaying as a target image a first image based on the actual height image data or a second image corresponding to the first image, and displaying as a reference image a third image based on the reference height data or a fourth image corresponding to the third image;
performing alignment of the target image and the reference image as first alignment by pattern matching;
specifying a measurement place for the measurement target; and
displaying information that shows a deviation between the measurement place represented by the actual height image data and the measurement place represented by the reference height data.

19. The non-transitory computer readable medium according to claim 13, further comprising, executing a step of specifying a reference position of the measurement target after the step of performing the first alignment, and performing alignment of the target image and the reference image as second alignment with the reference position taken as a reference.

20. A magnifying observation device comprising:
a stage on which a measurement target is to be placed;
a height image data acquisition unit for acquiring actual height image data that includes as height information a distance from a reference position to each part on the surface of the measurement target placed on the stage in one direction;
a storage part for storing three-dimensional CAD data representing the measurement target;
a display part;
an operation part operated by a user; and
an information processing part,
wherein the information processing part includes
a CAD data acquisition unit for acquiring the CAD data to be stored into the storage unit,
an acquisition command unit for giving a command to the height image data acquisition unit to acquire the actual height image data,
a CAD height data generation unit for generating a plurality of pieces of CAD height data that each include distances from a reference position to respective parts on the surface of the measurement target in a plurality of directions on the basis of the basic CAD data,
a reference height data selection unit for selecting, from the plurality of pieces of CAD height data, CAD height data with the highest matching degree with respect to the actual height image data, as reference height data,
an image display unit for making the display part display as a target image a first image based on the actual height image data or a second image corresponding to the first image, and making the display part display as a reference image a third image based on the reference height data or a fourth image corresponding to the third image,
an alignment performing unit for performing alignment of the target image and the reference image by pattern matching,
a measurement place specifying unit for specifying a measurement place for the measurement target on the basis of operation of the operation part, and
a deviation information display unit for making the display part display information that shows a deviation between the measurement place represented by the actual height image data and the measurement place represented by the reference height data.

* * * * *